(12) United States Patent
Edge

(10) Patent No.: US 11,910,304 B2
(45) Date of Patent: Feb. 20, 2024

(54) PLMN SELECTION FOR MASSIVE IOT OVER SATELLITE ACCESS

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

(*) Notice: Subject to any disclaimer, the term of this patent is extended or adjusted under 35 U.S.C. 154(b) by 148 days.

(21) Appl. No.: 17/233,411

(22) Filed: Apr. 16, 2021

(65) Prior Publication Data

US 2022/0338111 A1 Oct. 20, 2022

(51) Int. Cl.
*H04W 48/18* (2009.01)
*H04W 84/04* (2009.01)
*H04W 84/06* (2009.01)

(52) U.S. Cl.
CPC .......... *H04W 48/18* (2013.01); *H04W 84/042* (2013.01); *H04W 84/06* (2013.01)

(58) Field of Classification Search
CPC ....... H04W 48/18; H04W 8/26; H04W 60/06; H04W 84/042; H04W 8/06
See application file for complete search history.

(56) References Cited

U.S. PATENT DOCUMENTS

2011/0098039 A1* 4/2011 Lim ...................... H04M 1/724
455/433
2017/0005914 A1 1/2017 Edge et al.
2021/0212014 A1* 7/2021 Gao ....................... H04W 64/00
2022/0182891 A1* 6/2022 Wang ................ H04W 36/0016
2022/0303887 A1* 9/2022 Hietalahti ............. H04W 60/04

FOREIGN PATENT DOCUMENTS

WO 2020202121 A1 10/2020

OTHER PUBLICATIONS

"3rd Generation Partnership Project, Technical Specification Group Core Network and Terminals, Study on PLMN Selection for Satellite Access (Release 17)", 3GPP Standard, Technical Report, 3GPP TR 24.821, 3rd Generation Partnership Project (3GPP), Mobile Competence Centre, 650, Route Des Lucioles, F-06921 Sophia-Antipolis Cedex, France No. V0.4.0, Mar. 15, 2021 (Mar. 15, 2021), pp. 1-38, XP052000013, The whole document.
International Search Report and Written Opinion—PCT/US2022/020618—ISA/EPO—Jun. 24, 2022.

* cited by examiner

*Primary Examiner* — Wayne H Cai
(74) *Attorney, Agent, or Firm* — Procopio, Cory, Hargreaves & Savitch LLP

(57) ABSTRACT

A communication system including a UE, a base station, and a PLMN is disclosed. The UE may access a radio cell supported by a communication satellite. The UE may select a preferred PLMN for each of multiple potential geographic locations of the UE. The UE may transmit, to the base station via the radio cell and the communication satellite, an indication of the preferred PLMN for each of the multiple potential geographic locations of the UE. The base station may attempt to determine a current geographic location of the UE. The base station may determine a serving PLMN as the preferred PLMN for the current geographic location of the UE and may later determine a second PLMN if the current geographic location changes. The base station determination may not be visible to the UE which may reduce UE signaling and resource usage.

30 Claims, 17 Drawing Sheets

PLMN SELECTION FOR MASSIVE IOT OVER SATELLITE ACCESS

BACKGROUND

Technical Field

The present disclosure relates generally to communication systems, and more particularly, to wireless communication including preferred public land mobile network (PLMN) selection.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

One enhancement of 5G NR can be to support communication satellites which may extend network coverage and capacity without deploying, or with minimal deployment of, new terrestrial base stations. 5G NR over communication satellites may then be used to support IoT devices, massive IoT devices, mMTC devices, or other communication devices which may have constraints associated with low power, low resource capability, etc.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may access a radio cell supported by a communication satellite. The apparatus may select a preferred public land mobile network (PLMN) for each of multiple potential geographic locations of the UE. The apparatus may transmit, to a base station via the radio cell and the communication satellite, an indication of the preferred PLMN for each of the multiple potential geographic locations of the UE.

In another aspect of the disclosure, a method, a computer-readable medium, and an apparatus are provided. The apparatus may be a base station. The apparatus may receive, from the UE via a communication satellite and a radio cell, a non access stratum (NAS) message and an indication of a plurality of preferred PLMNs including a preferred PLMN for each of multiple potential geographic locations of the UE. The apparatus may attempt to determine a current geographic location of the UE. The apparatus may determine the serving PLMN as the preferred PLMN indicated by the UE for the current geographic location of the UE when the attempt to determine the current geographic location of the UE is successful. The apparatus may determine the serving PLMN as one of the plurality of preferred PLMNs indicated by the UE when the attempt to determine the current geographic location of the UE is not successful. The apparatus may forward the NAS message to the serving PLMN.

In another aspect of the disclosure, a method, a computer-readable medium, and an apparatus are provided. The apparatus may be a core network associated with a PLMN. The apparatus may receive, from a base station a NAS message, the NAS message received by the base station from the UE via a communication satellite. The apparatus may obtain a current geographic location of the UE. The apparatus may determine that the current geographic location of the UE is not supported by the serving PLMN. The apparatus may indicate, to the base station, the current geographic location of the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

Figure 1:
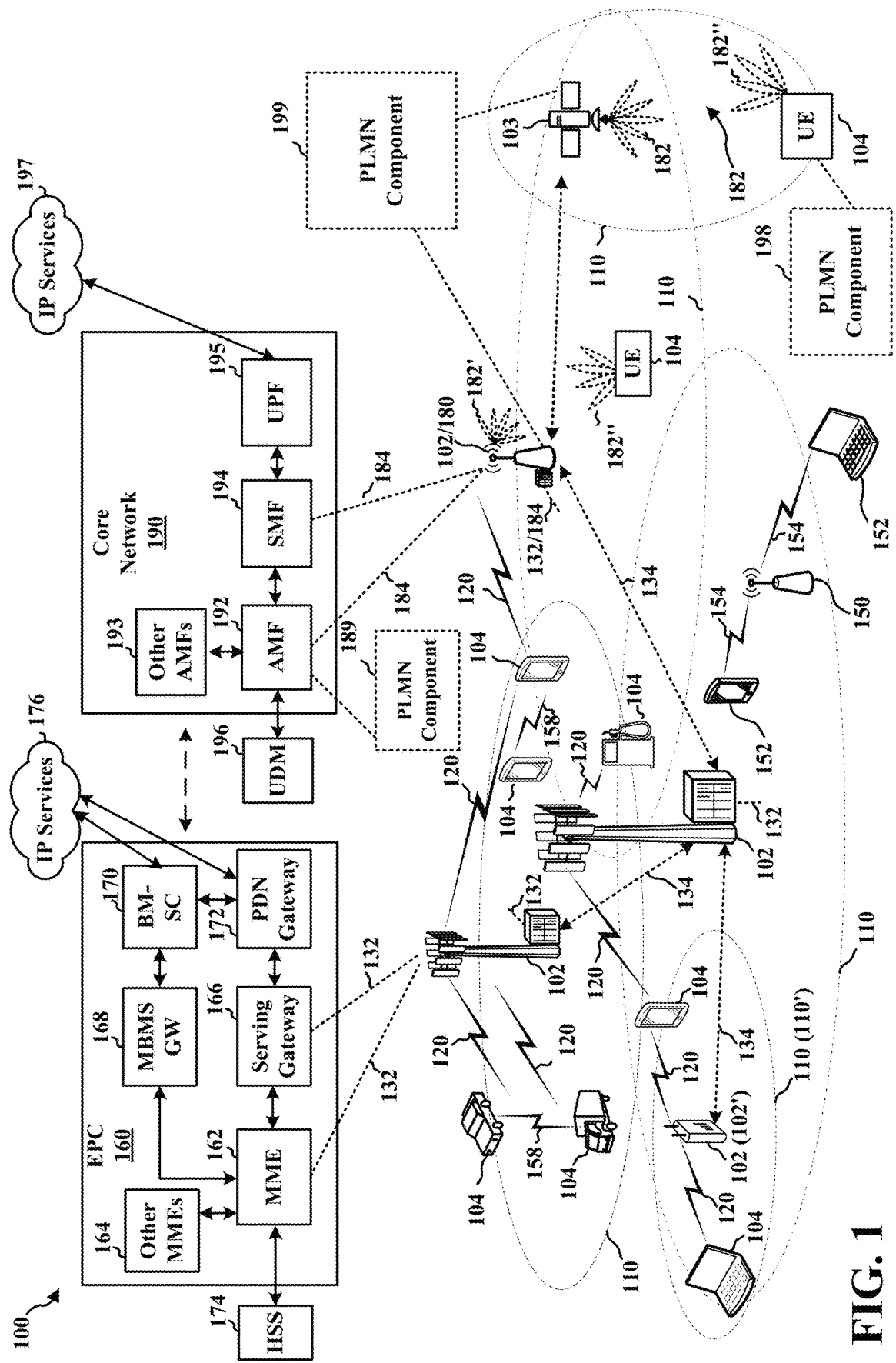
FIG. 1 is a diagram illustrating an example of a wireless communications system and an access network.

Like reference symbols in the various drawings indicate like elements, in accordance with certain example implementations. In addition, multiple instances of an element may be indicated by following a first number for the element with a letter or a hyphen and a second number. For example, multiple instances of an element 402 may be indicated as 402-1, 402-2, 402-3 etc. When referring to such an element using only the first number, any instance of the element is to be understood (e.g., element 402 in the previous example would refer to elements 402-1, 402-2, 402-3).

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Massive Internet of Things (MIoT) over Satellite Access supports automated devices, which may have low battery capacity. These automated devices also referred to as MIoT devices, may occasionally or periodically access remote sites. Such MIoT devices may have open sky access to communication satellites and optional non-guaranteed access to terrestrial networks. MIoT devices may have minimum battery lifetime requirements of several years, e.g., 2 years, 5 years, 10 years, etc. In some examples, the minimum battery lifetime requirement may be between 7-20 years, or more than 20 years. The MIoT devices may also have reduced or restricted processing capacity, limited signaling configurations, and/or low memory capability. In some aspects, the MIoT devices may not support global navigation satellite system (GNSS) self-location or may not support frequent GNSS self-location due to a minimum battery lifetime requirement. An MIoT device, also referred to as a user equipment (UE), may not be able to select a PLMN based on a UE location in some circumstances, such as where the UE is accessing a satellite and where the satellite supports access to multiple Public Land Mobile Networks (PLMNs) located in different countries.

For example, a UE that is unable to determine its geographic location may access a radio cell supported by a satellite that provides coverage to more than one geographic location, e.g., more than one country. The UE may then be unable to determine in which country it is located, which may cause the UE to be unable to select a PLMN serving the country in which the UE is located. Furthermore, the UE might still select a PLMN supporting a particular country and receive an error message from that PLMN if the UE is not located in that country, which may enable the UE to select a different PLMN serving the country in which the UE is located. However, such a process of selection and reselection may lead to higher battery power consumption than may be allowed by a minimum battery lifetime requirement for the UE. The aspects presented herein enable correct PLMN selection by an MIoT UE. In some aspects the correct PLMN selection may incur less battery power consumption than in the above-described examples where incorrect selection and reselection may be involved. For example. the aspects described herein can enable the UE to select a set of potential PLMNs based on potential countries in which the UE may be located, and may enable the network to select a particular PLMN for the UE based on an actual location of the UE without PLMN reselection by the UE.

In particular, the UE may select a preferred PLMN for each of multiple potential geographic locations of the UE. The UE may transmit, to a base station via a radio cell and a communication satellite, a non access stratum (NAS) message and an indication of at least one preferred PLMN for each of the multiple potential geographic locations of the UE. The base station may attempt to determine a current geographic location of the UE. The base station may then determine a serving PLMN. The base station may then forward a NAS message, received by the base station from the UE, to the serving PLMN. Accordingly, a correct PLMN may be selected for the UE even though the UE may not be capable of self location. Additionally, the aspects presented herein may reduce processing and signaling resource consumption at the UE. Therefore, the aspects described above may be particularly suitable for low-cost and/or low-power UEs such as MIoT UEs. In addition to MIoT UEs, the aspects may be applied to other UEs.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for NAS messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30

GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, NR nodeB (also referred to as a gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a PLMN, and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes control plane signaling between the UEs 104 and the core network 190. Generally, the AMF 192 supports mobility of UEs 104, registration of UEs with core network 190, and assists with session management. All user plane IP packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

A base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. A base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio phone, a global positioning system (GPS) receiver, a multimedia device, a video device, a digital audio player (e.g., MP3 player), a camera, a game console, a tablet, a smart device, a wearable device, an in vehicle system (IVS), an electric meter, a gas pump, a large or small kitchen appliance, a healthcare device, an implant, a sensor/actuator, a display, a tracking device, a telematics device, or any other similar functioning device. Some of the UEs 104 may be referred to as an IoT device (e.g., parking meter, gas pump, toaster, IVS, heart monitor, tracking device, telematics device, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a PLMN component 198 that may be configured to access a radio cell supported by a communication satellite 103. The communication satellite 103 may be referred to as a space vehicle (SV) and may be in a low earth orbit (LEO), medium earth orbit (MEO) or a geostationary earth orbit (GEO). The PLMN component 198 may be configured to select a preferred PLMN for each of multiple potential geographic locations of the UE. The PLMN component 198 may be configured to transmit, to a base station via the radio cell and the communication satellite, an indication of the preferred PLMN for each of the multiple potential geographic locations of the UE.

In certain aspects, a base station 102 or 180 may include a PLMN component 199 that may be configured to receive, from a UE 104 via a communication satellite 103 and a radio cell, a NAS message and an indication of a plurality of preferred PLMNs including a preferred PLMN for each of multiple potential geographic locations of the UE. The PLMN component 199 may be configured to attempt to determine a current geographic location of the UE. The PLMN component 199 may be configured to determine a serving PLMN as the preferred PLMN indicated by the UE for the current geographic location of the UE when the attempt to determine the current geographic location of the UE is successful. The PLMN component 199 may be configured to determine the serving PLMN as one of the plurality of preferred PLMNs indicated by the UE when the attempt to determine the current geographic location of the UE is not successful. The PLMN component 199 may be configured to forward the NAS message to the serving PLMN.

In certain aspects, the AMF 192 may include a PLMN component 189 that may be configured to receive, from a base station a NAS message, the NAS message received by the base station from a UE 104 via a communication satellite 103. The PLMN component 189 may be configured to obtain a current geographic location of the UE 104. The PLMN component 189 may be configured to determine that the current geographic location of the UE 104 is not supported by a serving PLMN. The PLMN component 189 may be configured to indicate, to the base station, the current geographic location of the UE 104.

Figure 2:
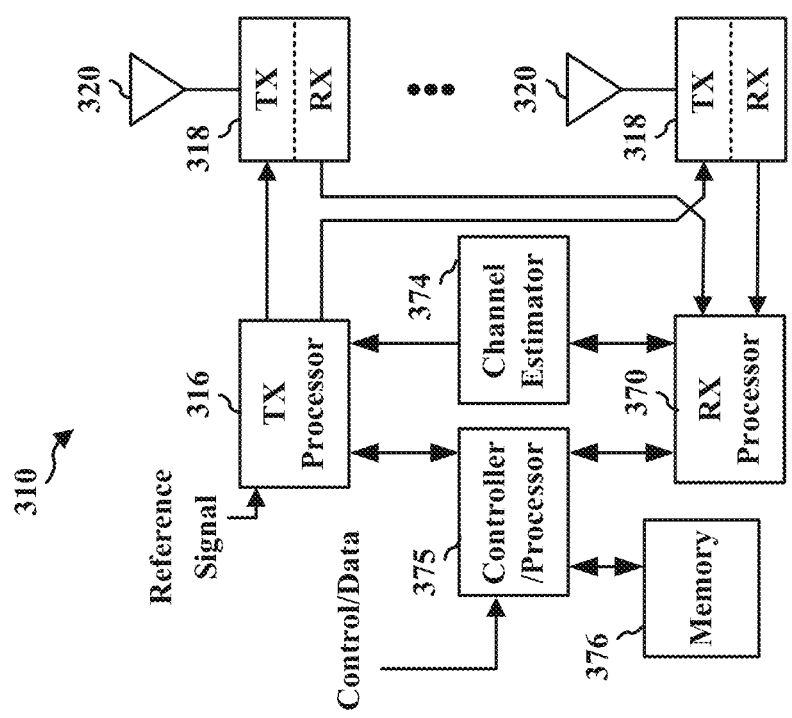
FIG. 2 is a diagram illustrating example aspects of a base station in an access network.
Figure 3:
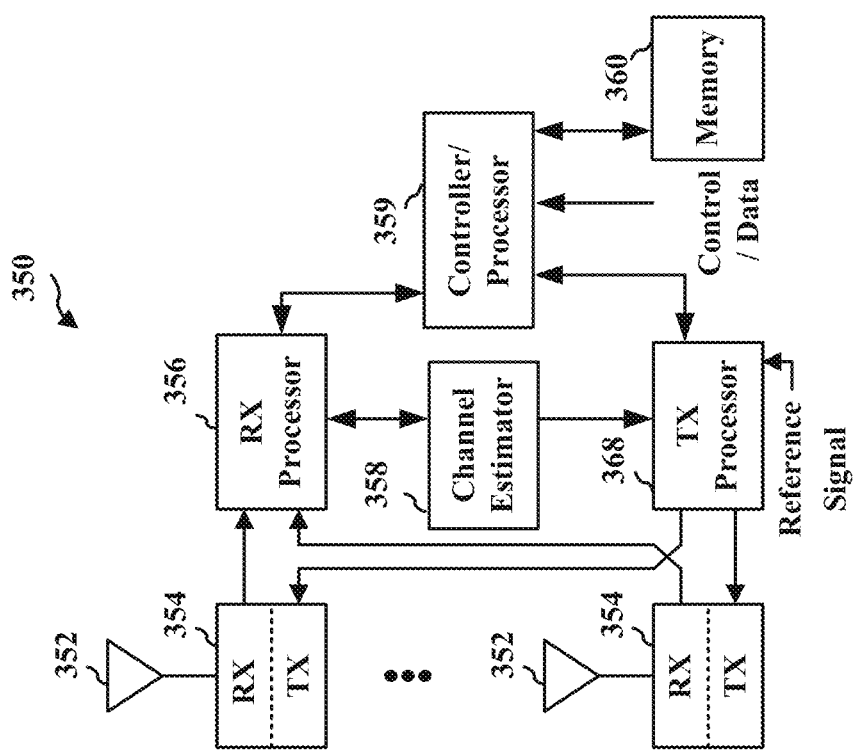
FIG. 3 is a diagram illustrating an example of a UE.

FIG. 2 is a block diagram of a base station 310 in an access network. FIG. 3 is a block diagram of a UE 350 in an access network. The base station 310 may be in communication with the UE 350. In a downlink (DL), IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., the master information block "MIB", system information blocks "SIBs"), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer protocol data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an acknowledgment (ACK) and/or negative ACK (NACK) protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Massive IoT (MIoT) over Satellite Access is a feature in which automated devices with limited battery capability may periodically access remote sites. This may be used to report telemetry information (e.g., weather reports), report location and status of a package, vehicle, aircraft, ship, pallet, wagon, animal, item of luggage, person, or provide monitoring reports for agriculture, road traffic, sea, or river traffic, etc. Open sky access to communication satellites and non-guaranteed access to terrestrial base stations may be supported.

Different from support of satellite access for mobile phone UEs (e.g., smartphone UEs), devices using MIoT may be expected to have severe battery lifetime constraints, e.g., a minimum battery lifetime requirement of 7-20 years. The devices may also have limited processing, signaling, or memory capability, or may not support global navigation satellite system (GNSS) self location. This means that PLMN selection methods for satellite access by normal UEs (e.g., smartphones) may not be optimum, and may not be acceptable due to their reliance on GNSS self location. For example, the normal UEs may not be associated with restricted memory, signaling, and/or processing capability which may be associated with MIoT devices. Accordingly, methods of PLMN selection for satellite access for MIoT devices may be advantageously provided.

Aspects described herein may be utilized when a UE is unable to determine its geographic location, and accesses a radio cell that provides coverage to more than one geographic location. The aspects may be based on multiple PLMN selection by a UE in which the UE may select PLMNs once, and may allow the network to select one particular PLMN for the UE.

Figure 4:
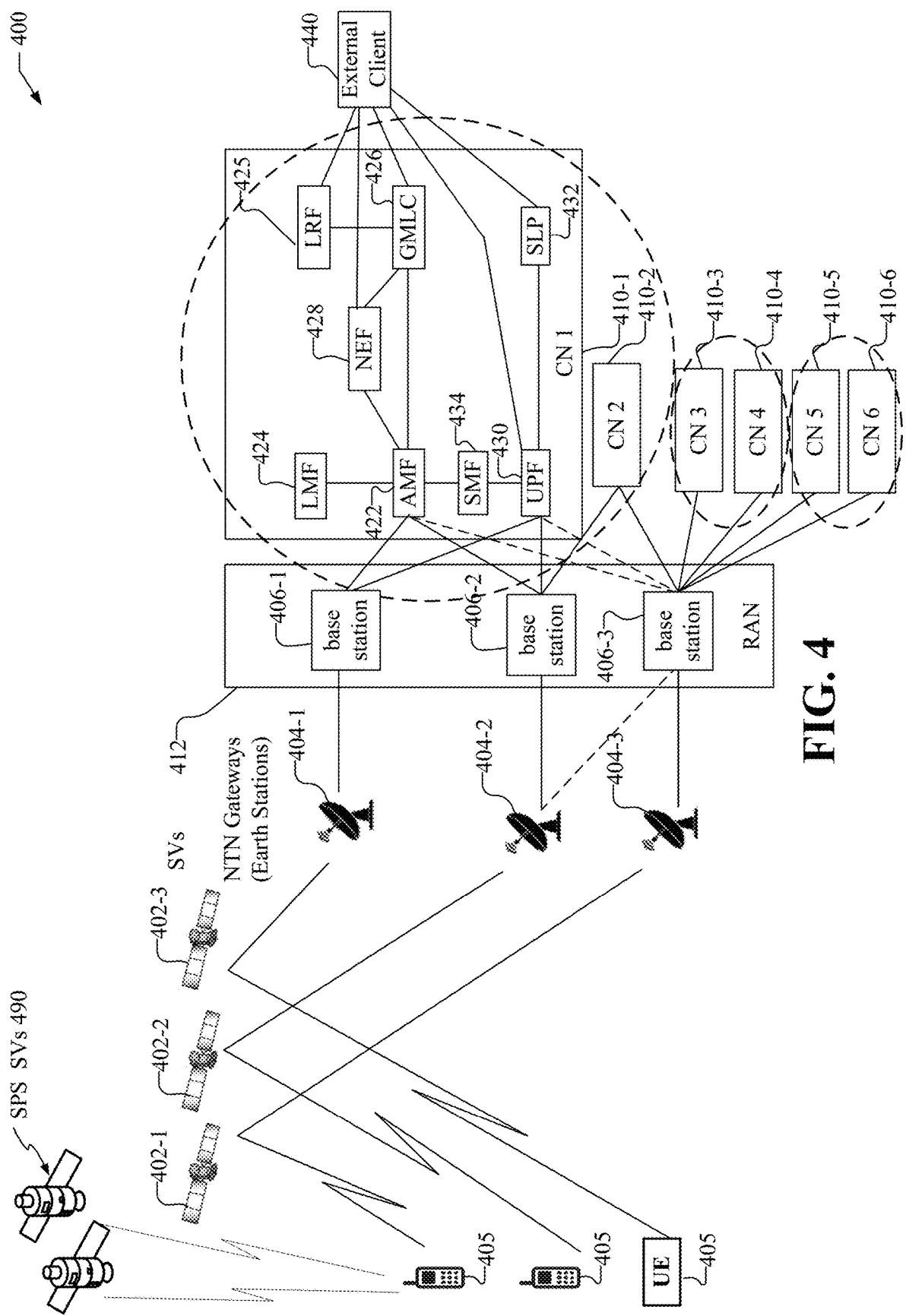
FIG. 4 illustrates an example network architecture capable of supporting satellite access using 5G NR in a transparent mode.

FIG. 4 illustrates an example network architecture 400 capable of supporting satellite access, e.g., using 5G NR. Although the aspects are described using the example of 5G NR, the concepts presented herein may also be applied for other types of core networks. FIG. 4 illustrates a network architecture with transparent SVs. A transparent SV may implement frequency conversion and a radio frequency (RF) amplifier in both uplink (UL) and downlink (DL) directions and may correspond to an analog RF repeater. A transparent SV, for example, may receive UL signals from all served UEs and may redirect the combined signals DL to an earth station without demodulating or decoding the signals. Similarly, a transparent SV may receive an UL signal from an earth station and redirect the signal DL to served UEs without demodulating or decoding the signal. However, the SV may frequency convert received signals and may amplify and/or filter received signals before transmitting the signals.

The network architecture 400 comprises a number of UEs 405, a number of SVs 402-1 to 402-3 (collectively referred to herein as SVs 402), a number of Non-Terrestrial Network (NTN) gateways 404-1 to 404-3 (collectively referred to herein as NTN gateways 404) (sometimes referred to herein simply as gateways 404, earth stations 404, or ground stations 404), a number of base stations (e.g., gNBs) capable of communication with UEs via SVs 402 referred to herein as simply as satellite base stations 406-1 to 406-3 (collectively referred to herein as base stations 406) that are part of an RAN 412 (e.g., an NG-RAN). The base stations 406 may correspond to the base station 310 in FIG. 2. The network architecture 400 is illustrated as further including components of core networks 410-1 to 410-6 (collectively referred to herein as CNs 410). In some aspects, the CNs 410 may include a number of Fifth Generation (5G) networks including 5G Core Networks (5GCNs) and may correspond to the core network 190 described in connection with FIG. 1. The CNs 410 may be public land mobile networks (PLMN) that may be located in the same country or in different countries. For example, CN1 410-1 and CN2 410-2 may be located in a same first country. CN3 410-3 and CN4 410-4 may be located in a same second country. CN5 410-5 and CN6 410-6 may be located in a same third country. Hereinafter any reference to a country may also include reference to an international area not generally recognized as a country. FIG. 4 illustrates various components within CN1 410-1 that may operate with the RAN 412. It should be understood that CN2 410-2 and other CNs may include identical, similar or different components and associated RANs, which are not illustrated in FIG. 4 in order to avoid unnecessary obfuscation. In some aspects, the CNs may be 5GCNs, a 5G network may also be referred to as an NR network; RAN 412 may be referred to as a Next Generation RAN (NG-RAN), a 5G RAN or as an NR RAN; and CN 410 may be referred to as a 5G CN or an NG Core network (NGC).

The network architecture 400 may further utilize information from SVs 490 for a Satellite Positioning System (SPS) including a GNSS like the Global Positioning System (GPS), GLObal NAvigation Satellite System (GLONASS), Galileo or Beidou or some other local or regional SPS, such as the Indian Regional Navigation Satellite System (IRNSS), European Geostationary Navigation Overlay Service (EGNOS), or Wide Area Augmentation System (WAAS), all of which are sometimes referred to herein as a GNSS. It is noted that SVs 490 act as navigation SVs and are separate and distinct from SVs 402, which act as communication SVs. However, it is not precluded that some of SVs 490 may also act as some of SVs 402 and/or that some of SVs 402 may also act as some of SVs 490. In some implementations, for example, the SVs 402 may be used for both communication and positioning. Additional components of the network architecture 400 are described below. The network architecture 400 may include additional or alternative components.

Permitted connections in the network architecture 400 with transparent SVs illustrated in FIG. 4, allow a base station 406 to access multiple Earth stations 404 and/or multiple SVs 402. A base station 406, e.g., illustrated by base station 406-3, may also be shared by multiple PLMNs (e.g., all of CN1 410-1 through CN6 410-6), which may all be in the same country or possibly in different countries, and an Earth station 404, e.g., illustrated by Earth station 404-2, may be shared by more than one base station 406. In one example, CN1 410-1 and CN2 410-2 may be located in a same first country. CN3 410-3 and CN4 410-4 may be located in a same second country. CN5 410-5 and CN6 410-6 may be located in a same third country.

FIG. 4 provides only a generalized illustration of various components, any or all of which may be utilized as appropriate, and each of which may be duplicated or omitted, as necessary. Specifically, although only three UEs 405 are illustrated, it will be understood that many UEs (e.g., hundreds, thousands, millions, etc.) may utilize the network architecture 400. Similarly, the network architecture 400 may include a larger (or smaller) number of SVs 490, SVs 402, earth stations 404, base stations 406, RAN 412, CNs 410, external clients 440, and/or other components. The illustrated connections that connect the various components in the network architecture 400 include data and signaling connections which may include additional (intermediary) components, direct or indirect physical and/or wireless connections, and/or additional networks. Furthermore, components may be rearranged, combined, separated, substituted, and/or omitted, depending on desired functionality.

While aspects of FIG. 4 illustrate a 5G-based network, similar network implementations and configurations may be used for other communication technologies, such as 3G, 4G LTE, etc.

The UE 405 may comprise and/or be referred to as a device, a mobile device, a wireless device, a mobile terminal, a terminal, a mobile station (MS), a Secure User Plane Location (SUPL) Enabled Terminal (SET), or by some other name. Moreover, UE 405 may correspond to a cellphone, smartphone, laptop, tablet, PDA, tracking device, navigation device, IoT device, or some other portable or moveable device. Typically, though not necessarily, the UE 405 may support wireless communication using one or more Radio Access Technologies (RATs) such as using Global System for Mobile communication (GSM), CDMA, Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G NR (e.g., using the RAN 412 and CN 410), etc. The UE 405 may also support wireless communication using a Wireless Local Area Network (WLAN) which may connect to other networks (e.g., the Internet) using a Digital Subscriber Line (DSL) or packet cable for example. The UE 405 further supports wireless communications using space vehicles, such as SVs 402. The use of one or more of these RATs may allow the UE 405 to communicate with an external client 440, e.g., via elements of a CN 410 such as User Plane Function (UPF) 430 or Gateway Mobile Location Center (GMLC) 426.

A UE 405 may include a single entity or may include multiple entities such as in a personal area network where a user may employ audio, video and/or data I/O devices and/or body sensors and a separate wireline or wireless modem.

In some aspects, a UE 405 may support position determination, e.g., using signals and information from space vehicles 490 in an SPS, such as GPS, GLONASS, Galileo or Beidou or some other local or regional SPS such as IRNSS, EGNOS or WAAS, all of which may be generally referred to herein as GNSS. Position measurements using SPS are based on measurements of propagation delay times of SPS signals broadcast from a number of orbiting satellites to a SPS receiver in the UE 405. Once the SPS receiver has measured the signal propagation delays for each satellite, the range to each satellite can be determined and precise navigation information including 3-dimensional position, velocity and time of day of the SPS receiver can then be determined using the measured ranges and the known locations of the satellites. Positioning methods which may be supported using SVs 490 may include Assisted GNSS (A-GNSS), Real Time Kinematic (RTK), Precise Point Positioning (PPP) and Differential GNSS (DGNSS). Information and signals from SVs 402 may also be used to support positioning. In some aspects, the UE 405 may further support positioning using terrestrial positioning methods, such as DL Time Difference of Arrival (DL-TDOA), Enhanced Cell ID (ECID), Round Trip signal propagation Time (RTT), multi-cell RTT, angle of arrival (AOA), angle of departure (AOD), time of arrival (TOA) and/or other positioning methods. To support these position methods, UE 405 may support various DL location measurements such as receive-time transmission-time difference (Rx-Tx), reference signal received power (RSRP), reference signal time difference (RSTD) and measurements of TOA, AOA and others.

An estimate of a location of a UE 405 may be referred to as a location, location estimate, location fix, fix, position, position estimate or position fix, and may be geographic, thus providing location coordinates for the UE 405 (e.g., latitude and longitude) which may or may not include an altitude component (e.g., height above sea level, height above or depth below ground level, floor level or basement level). Alternatively, a location of a UE 405 may be expressed as a civic location (e.g., as a postal address or the designation of some point or small area in a building such as a particular room or floor). A location of a UE 405 may also be expressed as an area or volume (defined either geographically or in civic form) within which the UE 405 is expected to be located with some probability or confidence level (e.g., 67%, 95%, etc.) A location of a UE 405 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise. When computing the location of a UE, local x, y, and possibly z coordinates may be solved, and then, if needed, the local coordinates may be converted into absolute coordinates (e.g., coordinates for latitude, longitude and altitude above or below mean sea level).

In other aspects, a UE may not include position or location capabilities, or it may be preferable for the UE to avoid at least some of the processing related to position or location determination. Aspects presented herein provide for improved PLMN selection for such UEs.

The UEs 405 are configured to communicate with CNs 410 via the SVs 402, earth stations 404, and base stations 406. As illustrated by RAN 412, one or more RANs associated with the CNs 410 may include one or more base stations 406. The RAN 412 may further include a number of terrestrial base stations (not shown) that are not capable of communication with UEs via SVs 402 (not shown). Pairs of terrestrial and/or satellite base stations, e.g., terrestrial base stations and/or base stations 406-1 in RAN 412 may be connected to one another using terrestrial links—e.g., directly or indirectly via other terrestrial base stations or base stations 406 and communicate using an Xn interface. Access to the network may be provided to UEs 405 via wireless communication between each UE 405 and a serving base station 406, via an SV 402 and an earth station 404. The base stations 406 may provide wireless communications access to the CN 410 on behalf of each UE 405, e.g., using 5G NR. 5G NR radio access may also be referred to as NR radio access or as 5G radio access and may be as defined by the 3GPP, for example.

Base stations (BSs) in the RAN 412 shown in FIG. 4 may also or instead include a next generation evolved Node B, also referred to as an ng-eNB. An ng-eNB may be connected to one or more base stations 406 and/or terrestrial base stations in RAN 412—e.g., directly or indirectly via other base stations 406, terrestrial base stations and/or other ng-eNBs. An ng-eNB may provide LTE wireless access and/or evolved LTE (eLTE) wireless access to a UE 405.

A base station 406 may be referred to by other names such as a gNB, a "satellite node", a satellite NodeB (sNB), or "satellite access node." The base stations 406 are not the same as terrestrial gNBs, but may be based on a terrestrial gNB with additional capability. For example, a base station 406 may terminate the radio interface and associated radio interface protocols to UEs 405 and may transmit DL signals to UEs 405 and receive UL signals from UEs 405 via SVs 402 and earth stations (ESs) 404. A base station 406 may also support signaling connections and voice and data bearers to UEs 405 and may support handover of UEs 405 between different radio cells for the same SV 402, between different SVs 402 and/or between different base stations 406. Base stations 406 may be configured to manage moving radio beams (e.g., for LEO SVs) and associated mobility of UEs 405. The base stations 406 may assist in the handover (or transfer) of SVs 402 between different Earth stations 404, different base stations 406, and between different countries. The base stations 406 may hide or obscure specific aspects of connected SVs 402 from the CN 410, e.g., by interfacing to a CN 410 in the same way or in a similar way to a terrestrial base stations, and may avoid a need for a CN 410 to maintain configuration information for SVs 402 or perform mobility management related to SVs 402. The base stations 406 may further assist in sharing of SVs 402 over multiple countries. The base stations 406 may communicate with one or more earth stations 404, e.g., as illustrated by base station 406-2 communicating with earth stations 404-2 and 404-1. The base stations 406 may be separate from earth stations 404, e.g., as illustrated by base stations 406-1 and 406-2, and earth stations 404-1 and 404-2. The base stations 406 may include or may be combined with one or more earth stations 404, e.g., using a split architecture. For example, with a split architecture, a base station 406 may include a Central Unit and an earth station may include or act as Distributed Unit (DU). A base station 406 may be fixed on the ground with transparent SV operation. In one implementation, one base station 406 may be physically combined with, or physically connected to, one earth station 404 to reduce complexity and cost.

The earth stations 404 may be shared by more than one base station 406 and may communicate with UE 405 via the SVs 402. An earth station 404 may be dedicated to just one space vehicle operator (SVO) and to one associated constellation of SVs 402 and may then be owned and managed by the SVO. Earth stations 404 may be included within a base station 406, e.g., as a base station-DU within a base station 406, which may occur when the same SVO or the same mobile network operator (MNO) owns both the base station 406 and the included earth stations 404. Earth stations 404 may communicate with SVs 402 using control and user plane protocols that may be proprietary to an SVO. The control and user plane protocols between earth stations 404 and SVs 402 may: (i) establish and release Earth Station 404 to SV 402 communication links, including authentication and ciphering; (ii) update SV software and firmware; (iii) perform SV Operations and Maintenance (O&M); (iv) control radio beams (e.g., direction, power, on/off status) and mapping between radio beams and earth station UL and DL payload; and/or (v) assist with handoff of an SV 402 or radio cell to another Earth station 404.

As noted, while FIG. 4 depicts nodes configured to communicate according to 5G NR and LTE communication protocols for an NG-RAN 412, nodes configured to communicate according to other communication protocols may be used, such as, for example, an LTE protocol for an E-UTRAN or an IEEE 802.11x protocol for a WLAN. For example, in a 4G Evolved Packet System (EPS) providing LTE wireless access to UE 405, a RAN may comprise an E-UTRAN, which may comprise base stations comprising evolved Node Bs (eNBs) supporting LTE wireless access. A core network for EPS may comprise an EPC. An EPS may then comprise an E-UTRAN plus EPC, where the E-UTRAN corresponds to NG-RAN 412 and the EPC corresponds to CN 410 in FIG. 4. The methods and techniques described herein for support of a RAN location server function may be applicable to such other networks.

The base stations 406 and terrestrial base stations (if present in the NG-RAN 412) may communicate with an AMF 422 in a CN 410, which, for positioning functionality, may communicate with a Location Management Function (LMF) 424. For example, the base stations 406 may provide an N2 interface to the AMF 422. An N2 interface between a base station 406 and a CN 410 may be the same as, or similar to, an N2 interface supported between a base station and a CN 410 for terrestrial NR access by a UE 405 and may use the Next Generation Application Protocol (NGAP), e.g., as defined in 3GPP Technical Specification (TS) 38.413 between a base station 406 and the AMF 422. The AMF 422 may support mobility of the UE 405, including radio cell change and handover and may participate in supporting a signaling connection to the UE 405 and possibly data and voice bearers for the UE 405. The LMF 424 may support positioning of the UE 405 when UE 405 accesses the NG-RAN 412 and may support position procedures/methods such as A-GNSS, DL-TDOA, RTK, PPP, DGNSS, ECID, AOA, AOD, multi-cell RTT and/or other positioning procedures including positioning procedures based on communication signals from one or more SVs 402. The LMF 424 may also process location services requests for the UE 405, e.g., received from the AMF 422 or from a GMLC 426. The LMF 424 may be connected to AMF 422 and/or to GMLC 426. In some embodiments, a node/system that implements the LMF 424 may additionally or alternatively implement other types of location-support modules, such as an Enhanced Serving Mobile Location Center (E-SMLC). It is noted that in some aspects, at least part of the positioning functionality (including derivation of a UE 405's location) may be performed at the UE 405 (e.g., using signal measurements obtained by UE 405 for signals transmitted by SVs 402, SVs 490, base stations and assistance data provided to the UE 405, e.g., by LMF 424).

The GMLC 426 may support a location request for the UE 405 received from an external client 440 and may forward such a location request to the AMF 422 for forwarding by the AMF 422 to the LMF 424. A location response from the LMF 424 (e.g., containing a location estimate for the UE 405) may be similarly returned to the GMLC 426 via the AMF 422, and the GMLC 426 may then return the location response (e.g., containing the location estimate) to the external client 440. The GMLC 426 is shown connected to only the AMF 422 in FIG. 4 though in some implementations may be connected to both the AMF 422 and the LMF 424 and may support direct communication between the GMLC 426 and LMF 424 or indirection communications, e.g., via the AMF 422.

A Network Exposure Function (NEF) 428 may be included in CN 410, e.g., connected to the GMLC 426 and the AMF 422. In some implementations, the NEF 428 may be connected to communicate directly with the external client 440. The NEF 428 may support secure exposure of capabilities and events concerning 5GCN 410 and UE 405 to an external client 440 and may enable secure provision of information from external client 440 to CN 410.

A UPF 430 may support voice and data bearers for UE 405 and may enable UE 405 voice and data access to other networks such as the Internet. The UPF 430 may be connected to base stations 406 and terrestrial base stations. UPF 430 functions may include: external Protocol Data Unit (PDU) session point of interconnect to a Data Network, packet (e.g., IP) routing and forwarding, packet inspection and user plane part of policy rule enforcement, Quality of Service (QoS) handling for user plane, downlink packet buffering and downlink data notification triggering. UPF 430 may be connected to a Secure User Plane Location (SUPL) Location Platform (SLP) 432 to enable support of positioning of UE 405 using the SUPL location solution defined by the Open Mobile Alliance (OMA). SLP 432 may be further connected to or accessible from external client 440.

As illustrated, a Session Management Function (SMF) 434 connects to the AMF 422 and the UPF 430. The SMF 434 may have the capability to control both a local and a central UPF within a PDU session. SMF 434 may manage the establishment, modification and release of PDU sessions for UE 405, perform IP address allocation and management for UE 405, act as a Dynamic Host Configuration Protocol (DHCP) server for UE 405, and select and control a UPF 430 on behalf of UE 405.

The external client 440 may be connected to the core network 410 via the GMLC 426, the SLP 432 and/or UPF 430, and in some implementations, the NEF 428. The external client 440 may optionally be connected to the core network 410 and/or to a location server, which may be, e.g., an SLP, that is external to CN 410, via the Internet. The external client 440 may be connected to the UPF 430 directly or through the Internet. The external client 440 may be a server, a web server, or a user device, such as a personal computer, a UE, etc.

A Location Retrieval Function (LRF) 425 may be connected to the GMLC 426, as illustrated, and in some implementations, to the SLP 432, e.g., as defined in 3GPP TSs 23.271 and 23.167. LRF 425 may perform the same or similar functions to GMLC 426, with respect to receiving and responding to a location request from an external client 440 that corresponds to a Public Safety Answering Point (PSAP) supporting an emergency call from UE 405. One or more of the GMLC 426, LRF 425, and SLP 432 may be connected to the external client 440, e.g., through another network, such as the Internet.

Support of transparent SVs with the network architecture shown in FIG. 4 may impact the communication system as follows. The CN 410 may treat a satellite RAT as a new type of RAT with longer delay, reduced bandwidth and/or higher error rate. Consequently, while there may be some impact to PDU session establishment and mobility management (MM) and connection management (CM) procedures. The SVs 402 may be shared with other services (e.g., satellite TV, fixed Internet access) with 5G NR mobile access for UEs added in a transparent manner. This may enable legacy SVs 402 to be used and may avoid the need to deploy a new type of SV 402. Further, the base stations 406 may be fixed and may be configured to support one country or multiple countries and one or more PLMNs in that one country or in those multiple countries. The base stations 406 may assist assignment and transfer of SVs 402 and radio cells between base stations 406 and earth stations 404 and support handover of UEs 405 between radio cells, SVs 402 and other base stations 406. Thus, the base station 406 may differ from a terrestrial gNB. Additionally, a coverage area of a base station 406 may be much larger than the coverage area of a terrestrial base station.

In some implementations, the radio beam coverage of an SV 402 may be large, e.g., up to or greater than 4000 kms across, and may provide access to more than one country. An earth station 404 may be shared by multiple base stations (e.g., earth station 404-2 may be shared by base stations 406-2 and 406-3), and a base station 406 may be shared by multiple core networks in separate PLMNs located in the same country or in different countries (e.g., base station 406-2 may be shared by CN1 410-1 and CN2 410-1, which may correspond to different PLMNs in the same country or in different countries).

Figure 5:
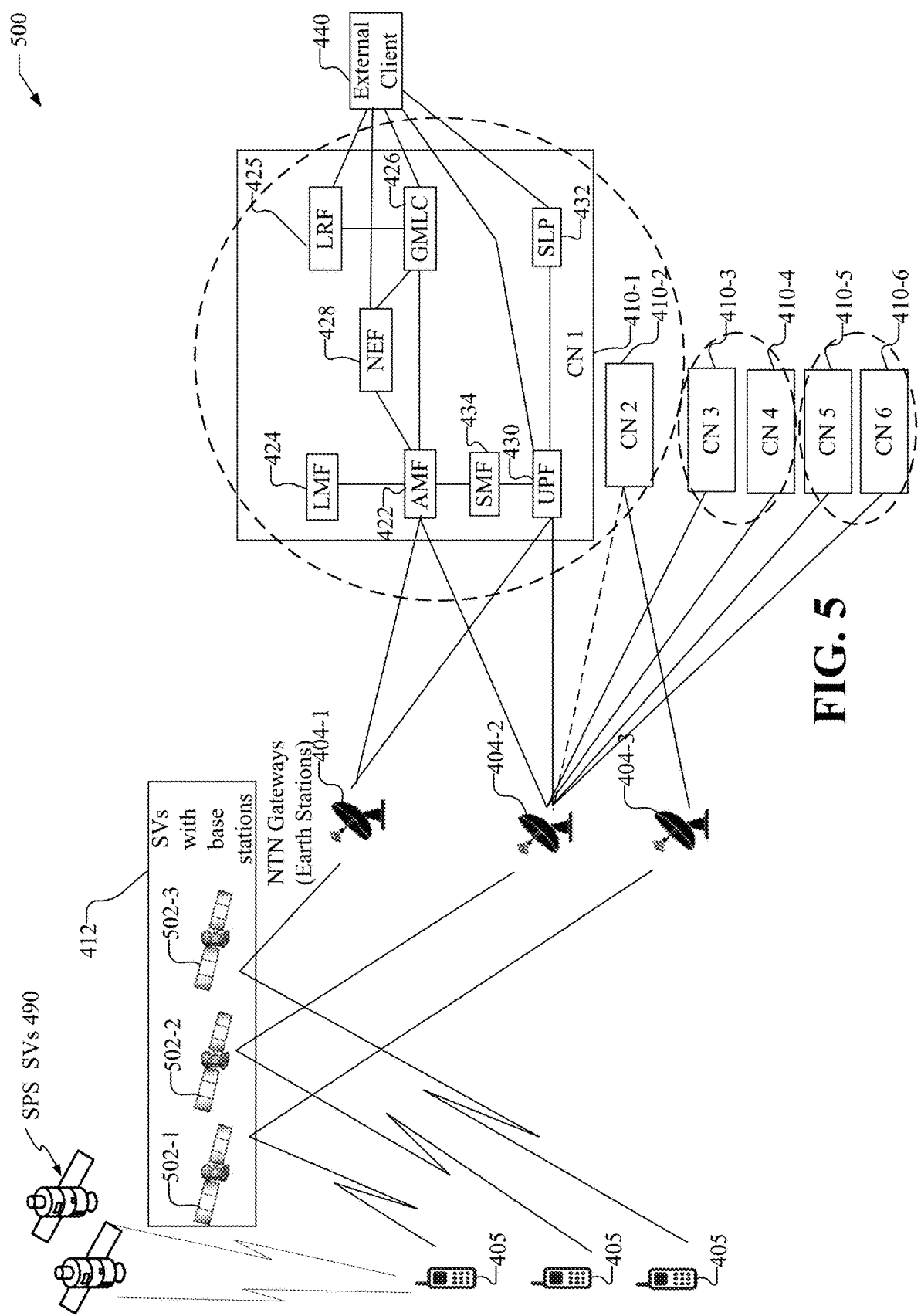
FIG. 5 illustrates an example network architecture capable of supporting satellite access using 5G NR in a regenerative mode.

FIG. 5 shows a diagram of a network architecture 500 capable of supporting satellite access, e.g., using 5G NR. The network architecture shown in FIG. 5 is similar to that shown in FIG. 4, like designated elements being similar or the same. FIG. 5, however, illustrates a network architecture with regenerative SVs 502-1, 502-2, and 502-3 (collectively SVs 502), as opposed to transparent SVs 402 shown in FIG. 4. A regenerative SV 502, unlike a transparent SV 402, includes an on-board base station 502 (e.g., includes the functional capability of a base station), and is sometimes referred to herein as an SV/base station 502. The on-board base station 502 may correspond to the base station 310 in FIG. 2. The RAN 412 is illustrated as including the SV/base stations 502. Reference to a base station 502 is used herein when referring to SV/base station 502 functions related to communication with UEs 405 and CNs 410, whereas reference to an SV 502 is used when referring to SV/base station 502 functions related to communication with earth stations 404 and with UEs 405 at a physical radio frequency level. However, there may be no precise delimitation of an SV 502 versus a base station 502.

An onboard base station 502 may perform many of the same functions as a base station 406 as described previously.

For example, a base station 502 may terminate the radio interface and associated radio interface protocols to UEs 405 and may transmit DL signals to UEs 405 and receive UL signals from UEs 405, which may include encoding and modulation of transmitted signals and demodulation and decoding of received signals. A base station 502 may also support signaling connections and voice and data bearers to UEs 405 and may support handover of UEs 405 between different radio cells for the same base station 502 and between different base stations 502. The base stations 502 may assist in the handover (or transfer) of SVs 502 between different Earth stations 404, different CNs 410, and between different countries. The base stations 502 may hide or obscure specific aspects of SVs 502 from the CN 410, e.g., by interfacing to a CN 410 in the same way or in a similar way to a terrestrial base station. The base stations 502 may further assist in sharing of SVs 502 over multiple countries. The base stations 502 may communicate with one or more earth stations 404 and with one or more CNs 410 via the earth stations 404. In some implementations, base stations 502 may communicate directly with other base stations 502 using Inter-Satellite Links (ISLs) (not shown in FIG. 5), which may support an Xn interface between any pair of base stations 502.

With LEO SVs, an SV/base station 502 may manage moving radio cells with coverage in different countries at different times. Earth stations 404 may be connected directly to the CN 410, as illustrated. For example, as illustrated, earth station 404-1 may be connected to AMF 422 and UPF 430 of CN1 410-1, while earth station 404-2 may be similarly connected to CN1 410-1 through CN6 410-6, and earth station 404-3 is connected to CN2 410-2. The earth stations 404 may be shared by multiple CNs 410, for example, if Earth stations 404 are limited. For example, in some implementations (illustrated with dotted lines), earth station 404-2 may be connected to all of CN1 410-1 through CN6 410-6. The CN 410 may need to be aware of SV 502 coverage areas in order to page UEs 405 and to manage handover. Thus, as can be seen, the network architecture 500 with regenerative SVs may have more impact and complexity with respect to both base stations 502 and CNs 410 than the network architecture with transparent SVs 402 shown in FIG. 4.

Support of regenerative SVs with the network architecture shown in FIG. 5 may impact the network architecture 500 as follows. The CN 410 may be impacted if fixed TAs and fixed cells are not supported, because core components of mobility management and regulatory services, which are based on fixed cells and fixed TAs for terrestrial PLMNs, may be replaced by a new system (e.g., based on UE 405 location). If fixed TAs and fixed cells are supported, an entity in the CN 410 (e.g., the AMF 422) may map any fixed TA to one or SVs 502 with current radio coverage of the fixed TA when performing paging of a UE 405 that is located in this fixed TA. This could require configuration in the CN 410 of long term orbital data for SVs 502 (e.g., obtained from an SVO for SVs 502) and could add significant new impact to a CN 410.

A new SV/base station 502 may support regulatory and other requirements for multiple countries. A GEO SV 502 coverage area may include several or many countries, whereas a LEO or medium earth orbit (MEO) SV 502 may orbit over many countries. Support of fixed TAs and fixed cells may then include an SV/base station 502 configured with fixed TAs and fixed cells for an entire worldwide coverage area. Alternatively, AMFs 422 (or LMFs 424) in individual CNs 410 could support fixed TAs and fixed cells for the associated PLMN to reduce SV/base station 502 complexity and at the expense of more 5GCN 410 complexity. Additionally, SV/base station 502 to SV/base station 502 ISLs may change dynamically as relative SV/base station 502 positions change, making Xn related procedures more complex.

Figure 6:
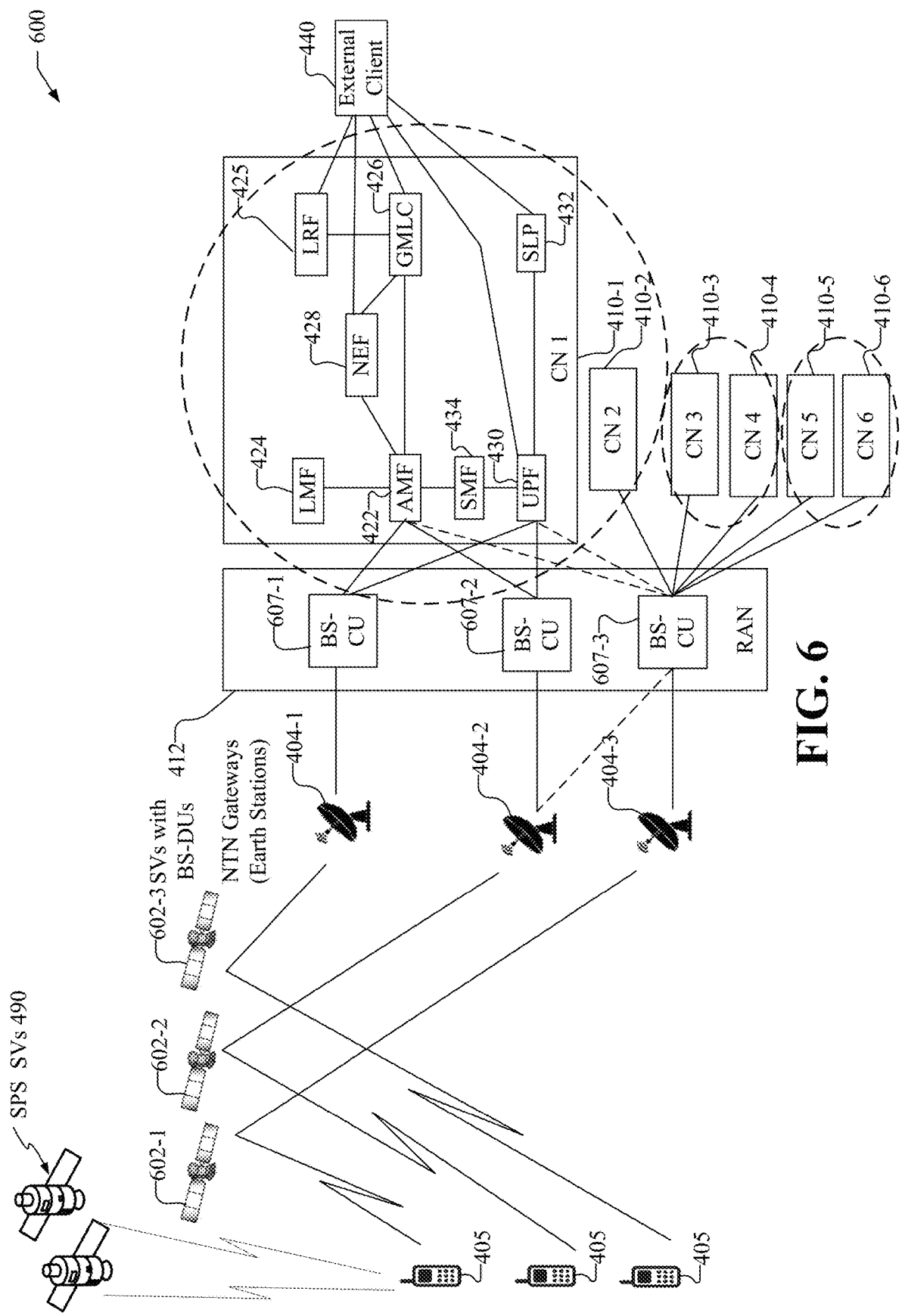
FIG. 6 illustrates an example network architecture capable of supporting satellite access using 5G NR in an alternative regenerative mode.

FIG. 6 shows a diagram of a network architecture 600 capable of supporting satellite access, e.g., using 5G NR. The network architecture shown in FIG. 6 is similar to that shown in FIGS. 4 and 5, like designated elements being similar or the same. FIG. 6, however, illustrates a network architecture with regenerative SVs 602-1, 602-2, and 602-3 (collectively referred to as SVs 602), as opposed to transparent SVs 402 shown in FIG. 4, and with a split architecture for the base stations. The base stations 607 include a central unit and may sometimes be referred as a base station-CU 607, and a regenerative SV 602, unlike a transparent SV 402, includes an on-board base station Distributed Unit (base station-DU) 602, and is sometimes referred to herein as an SV/base station-DU 602. The base station-CU 607 and the base station-DU 602, collectively, may correspond to the base station 310 in FIG. 2. Reference to a base station-DU 602 is used herein when referring to SV/base station 602 functions related to communication with UEs 405 and base station-CUs 607, whereas reference to an SV 602 is used when referring to SV/base station-DU 602 functions related to communication with earth stations 404 and with UEs 405 at a physical radio frequency level. However, there may be no precise delimitation of an SV 602 versus a base station-DU 602.

Each base station-DU 602 communicates with one ground based base station-CU 607 via one or more earth stations 404. One base station-CU 607 together with the one or more base station-DUs 602 which are in communication with the base station-CU 607 performs functions, and may use internal communication protocols, which are similar to or the same as a gNB with a split architecture, e.g., as described in 3GPP TS 38.401. Here a base station-DU 602 may correspond to and performs functions similar to or the same as a gNB Distributed Unit (gNB-DU), e.g., as defined in 3GPP TS 38.401, while a base station-CU 607 may correspond to and perform functions similar to or the same as a gNB Central Unit (gNB-CU), e.g., as defined in 3GPP TS 38.401. However, a base station-CU 607 and a base station-DU 602 may each include additional capability to support UE 405 access using SVs 602.

A base station-DU 602 and a base station-CU 607 may communicate with one another using an F1 Application Protocol (F1AP), e.g., as defined in 3GPP TS 38.473 and together may perform some or all of the same functions as a base station 406 or base station 502 as described previously. To simplify references to different types of base station in the description below, a base station-DU 602 may sometimes be referred to a base station 602 (without the "DU" label), and a base station-CU 607 may sometimes be referred to a base station 607 (without the "CU" label).

A base station-DU 602 may terminate the radio interface and associated lower level radio interface protocols to UEs 405 and may transmit DL signals to UEs 405 and receive UL signals from UEs 405, which may include encoding and modulation of transmitted signals and demodulation and decoding of received signals. A base station-DU 602 may support and terminate Radio Link Control (RLC), Media Access Control (MAC) and Physical (PHY) protocol layers for the NR RF interface to UEs 405, e.g., as defined in 3GPP TSs 38.201, 38.502, 38.211, 38.212, 38.213, 38.214, 38.215, 38.321 and 38.322. The operation of a base station-DU 602 is partly controlled by the associated base station-CU 607. One base station-DU 607 may support one or more NR radio cells for UEs 405. A base station-CU 607 may support and terminate a Radio Resource Control (RRC) protocol, Packet Data Convergence Protocol (PDCP) and Service Data Protocol (SDAP) for the NR RF interface to UEs 405, e.g., as defined in 3GPP TSs 38.331, 38.323, and 37.324, respectively. A base station-CU 607 may also be split into separate control plane (CP) (base station-CU-CP) and user plane (UP) (base station-CU-UP) portions, where a base station-CU-CP communicates with one or more AMFs 422 in one more CNs 410 using the Next Generation Application Protocol (NGAP) and where a base station-CU-UP communicates with one or more UPFs 430 in one more CNs 410 using a General Packet Radio System (GPRS) tunneling protocol (GTP) user plane protocol (GTP-U), e.g., as defined in 3GPP TS 29.281. A base station-DU 602 and base station-CU 607 may communicate over an F1 interface to (a) support control plane signaling for a UE 405 using IP, Stream Control Transmission Protocol (SCTP) and F1 Application Protocol (F1AP) protocols, and (b) to support user plane data transfer for a UE using IP, User Datagram Protocol (UDP), PDCP, SDAP, GTP-U and NR User Plane Protocol (NRUPP) protocols.

A base station-CU 607 may communicate with one or more other base station-CUs 607 and/or with one more other terrestrial base stations using terrestrial links to support an Xn interface between any pair of base station-CUs 602 and/or between any base station-CU 607 and any terrestrial base station.

A base station-DU 602 together with a base station-CU 607 may: (i) support signaling connections and voice and data bearers to UEs 405; (ii) support handover of UEs 405 between different radio cells for the same base station-DU 602 and between different base station-DUs 602; and (iii) assist in the handover (or transfer) of SVs 602 between different Earth stations 404, different CNs 410, and between different countries. A base station-CU 607 may hide or obscure specific aspects of SVs 602 from a CN 410, e.g., by interfacing to a CN 410 in the same way or in a similar way to a terrestrial base station. The base station-CUs 607 may further assist in sharing of SVs 602 over multiple countries.

In network architecture 600, the base station-DUs 602 that communicate with and are accessible from any base station-CU 607 may change over time with LEO SVs 602. With the split base station architecture, a CN 410 may connect to fixed base station-CUs 607 which do not change over time and which may reduce difficulty with paging of a UE 405. For example, a CN 410 may not need to know which SV/base station-DUs 602 are needed for paging a UE 405. The network architecture with regenerative SVs 602 with a split base station architecture may thereby reduce CN 410 impact at the expense of additional impact to a base station-CU 607.

Support of regenerative SVs 602 with a split base station architecture as shown in FIG. 6 may impact the network architecture 600 as follows. The impact to CN 410 may be limited as for transparent SVs 402 discussed above. For example, the CN 410 may treat a satellite RAT in network architecture 600 as a new type of RAT with longer delay, reduced bandwidth and/or higher error rate. Consequently, while there may be some impact to PDU session establishment and Mobility Management (MM) and Connection Management (CM) procedures, impacts to an AMF 422 (or LMF 424) may be small. The impact on SV/base station-DUs 602 may be less than the impact on SV/base stations 502 (with non-split architecture), as discussed above in reference to FIG. 5. The SV/base station-DU 602 may manage changing association with different (fixed) base station-CUs 607. Further, an SV/base station-DU 602 may manage radio beams and radio cells. The base station-CU 607 impacts may be similar to base station 406 impacts for a network architecture with transparent SVs 402, as discussed above, except for extra impacts to manage changing associations with different base station-DUs 602 and reduced impacts to support radio cells and radio beams which may be transferred to base station-DUs 602.

SVOs may be capable of supporting satellite access using 5G NR or some other wireless access type such as CDMA. Various SVOs may employ different numbers of LEO SVs and Earth gateways and may use different technologies. For example, SVOs include SVOs may use transparent ("bent pipe") LEO SVs with CDMA, and regenerative LEO SVs capable of ISL. Constellations of LEO SVs to support fixed Internet access.

While supporting satellite access to a wireless network, an SV 402/502/602 may transmit radio beams (also referred to just as "beams") over multiple countries. For example, a beam transmitted by an SV 402/502/602 may overlap two or more countries.

In some aspects, a base station 406/502/607 may serve CNs 410 located in different countries (e.g., as could be the case for base station 406-3, base station 502-2 and base station 607-3 shown in FIGS. 4-6). In some aspects, the base station may verify that each UE 405 accessing the base station 406/502/607 is registered in and connected to a CN 410 that serves the country in which the UE 405 is located.

Figure 7:
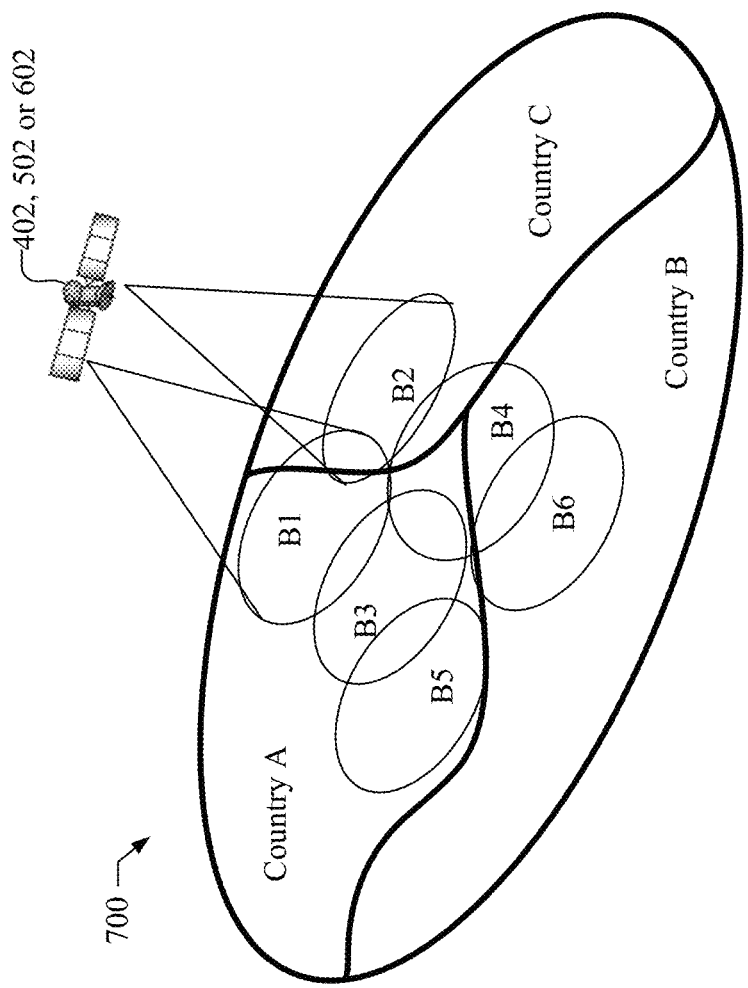
FIG. 7 illustrates a space vehicle (SV) generating multiple beams over an area that includes portions of multiple countries.

FIG. 7, by way of example, illustrates an SV 402, 502, 602 generating multiple beams identified as beams having individual coverage shown as B1, B2, B3, B4, B5, and B6 over an area 700 that includes portions of multiple countries, e.g., country A, country B, and country C. For example, the beams having coverage B1, B3, B5 may be assigned to country A, a beam with coverage B6 may be assigned to country B, and a beam with coverage B2 may be assigned to country C. On the other hand, the beam that provides coverage B4 may be assigned to all of countries A, B, and C. Aspects described herein may help a low-power UE (e.g., an MIoT UE) accessing the radio cell, such as the radio cell corresponding to the coverage B4, to select an appropriate PLMN without determining a position/location of the UE (e.g., using GNSS) or by using a reduced position/location determination process.

Figure 8:
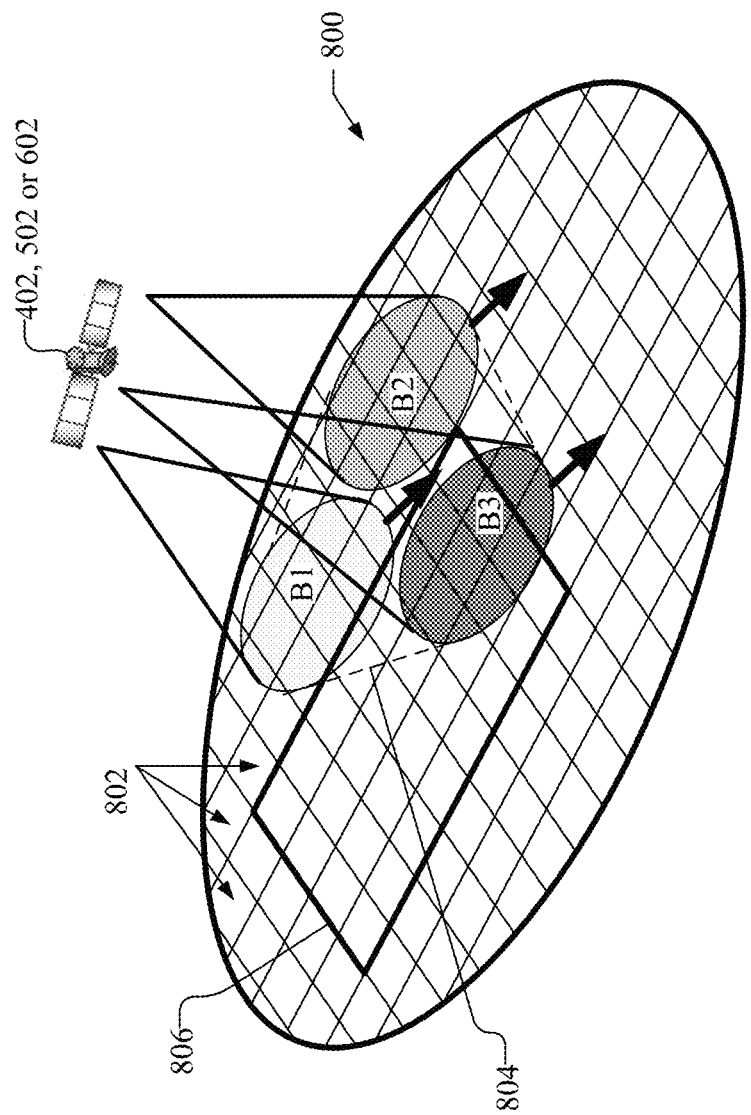
FIG. 8 illustrates radio cells produced by an SV over an area.

FIG. 8 illustrates radio cells produced by an SV 402, 502, 602 over an area 800 that includes a number of Earth fixed cells 802. A radio cell may comprise a single beam or multiple beams, e.g., all beams in a radio cell may use the same frequency or a radio cell may comprise one beam for each frequency in a set of different frequencies. For example, beams B1, B2 and B3 may support three separate radio cells (one beam per radio cell) or may collectively support a single radio cell (e.g., radio cell 804 shown with dotted lines). A radio cell may or may not cover a single contiguous area.

Radio beams and radio cells produced by an SV 402, 502, 602 may not align with cells used by terrestrial wireless networks, e.g., NR terrestrial cells or LTE terrestrial cells. For example, in an urban area, a radio beam or radio cell produced by an SV 402, 502. 602 may overlap with many CN terrestrial cells. When supporting satellite access to a wireless network, radio beams and radio cells produced by an SV 402, 502, 602 may be hidden from a CN 410.

As illustrated in FIG. 8, an area 800 may include a number of Earth fixed cells 802, as well as fixed tracking areas (TAs)

such as TA 806. Fixed cells are not "real cells," e.g., used for terrestrial NR and LTE access, and may be referred to as "virtual cells" or "geographic cells." A fixed cell, such as fixed cells 802, has a fixed geographic coverage area, which may be defined by a PLMN operator. For example, the coverage area of a fixed cell or a fixed TA may comprise the interior of a circle, ellipse, rectangle, hexagon or polygon. The coverage area may be fixed relative to the surface of the Earth and not change with time, unlike the coverage area of a radio cell which typically changes with time for a LEO or MEO SV. A fixed cell 802 may be treated by a CN 410 the same as a real cell that supports terrestrial network access, e.g., terrestrial NR access. Groups of fixed cells 802 may define a fixed TA 806, which may be treated by a CN the same as TAs that are defined for terrestrial network access. Fixed cells and fixed TAs used for satellite wireless access (e.g., 5G satellite wireless access) may be used by a CN 410 to support mobility management and regulatory services for UEs 405 with minimal new impact.

With regenerative SVs 502 having a non-split architecture as in network architectures 500, each radio cell may remain with the same SV 502 and may have a moving coverage area supporting different CNs 410 at different times.

With transparent SVs 402 and regenerative SVs 602 for a split architecture as in network architecture 600, each radio cell may be assigned to and controlled by one base station 406 or 607 on behalf of one or more PLMNs in one country. For a GEO SV 402/602, the assignment to a base station 406/607 may be permanent or temporary. For example, the assignment may change on a daily basis to allow for peak traffic occurrence at different times in different parts of the SV 402/602 radio footprint and/or may change over a longer period to accommodate changing regional traffic demands. For a non-geostationary (NGEO) SV 402/602, the assignment might last for a short time, e.g., only 5-15 minutes. A non-permanent radio cell may then be transferred to a new base station 406/607 as necessary (e.g., when access to the NGEO SV 402/602 is transferred to the new base station 406/607). Each base station 406/607, for example, may have a fixed geographic coverage area, e.g., comprising a plurality of fixed cells 802 and fixed TAs. A radio cell for a first NGEO SV 402/602 may be transferred from a first base station 406/607 to a second base station 406/607 when (or after) moving into the fixed coverage area of the second base station 406/607. Prior to this transfer, UEs 405 accessing the radio cell in a connected state may be moved to a new radio cell for the first base station 406/607 or could be handed off to the second base station 406/607 as part of transferring the radio cell. An SV 402/602 may be accessed from only one base station 406/607 or from multiple base stations 406/607, possibly in different countries. In one implementation, an SV 402/602 may be assigned to multiple base stations 406/607 by partitioning radio cells produced by the SV 402/602 among the different base stations 406/607. Radio cells may then be transferred to new base stations 406/607 (and to new countries) as the SV 402/602 moves or as traffic demands change. Such an implementation would be a form of a soft handoff in which SV 402/602 transfer from one base station 406/607 to another base station 406/607 occurs in increments of radio cells and not all at once.

Figure 9:
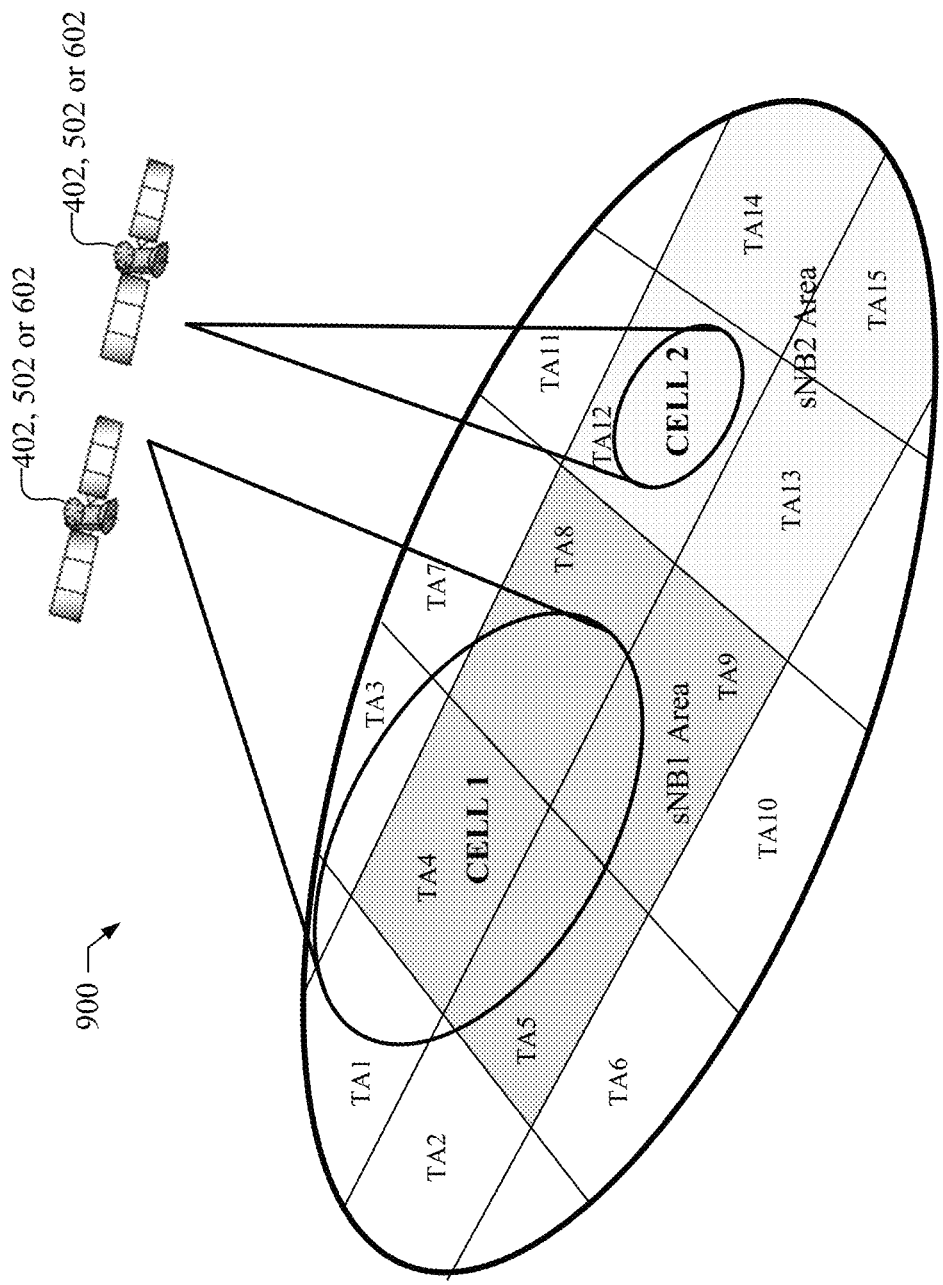
FIG. 9 illustrates an example of assignment of radio cells, produced by one or more SVs over an area.

FIG. 9 shows an example of assignment of radio cells, e.g., cell 1 and cell 2, produced by one or more SVs 402, 502, 602 over an area 900. As illustrated, the area 900 includes a number of fixed TAs, e.g., TA1-TA15, wherein TA4, TA5, TA8, and TA9 are assigned to a base station 1 (which may be a base station 406, base station 502 or a base station 607), and TA12, TA13, TA14, and TA15 are assigned to a base station 2 (which may be another base station 406, 502 or 607). In one implementation, a radio cell may be considered to support a fixed TA if the radio cell is wholly within the TA (e.g., Cell 2 within TA 12); if the TA is wholly within the radio cell (e.g., TA4 within Cell 1); or if the overlap of the area of a radio cell and a TA exceeds a predetermined threshold fraction of the total area of the radio cell or the total area of the TA (e.g., cell 1 overlap with TA1, TA3, TA5, TA8 or TA9). An SV 402, 502, 602 may broadcast, e.g., in a System Information Block type 1 (SIB1) or SIB type 2 (SIB2), the identities (IDs) of supported PLMNs (e.g., where a PLMN ID comprises a Mobile Country Code (MCC) and Mobile Network Code (MNC)) and, for each supported PLMN, the IDs of supported TAs (e.g., where the ID of TA comprises a Tracking Area Code (TAC)). For an NGEO SV, the supported PLMNs and TAs may change as radio cell coverage areas change. A base station 406/502/607 may determine PLMN and TA support (and thus the PLMN IDs and TACs which are broadcast in a SIB for each radio cell) from known ephemeris data for each SV 402/502/602 and a known directionality and angular range for component radio beams for each radio cell (e.g., Cell 1 and Cell 2). A base station 406/502/607 may then update SIB broadcasting as a radio cell coverage area changes.

Thus, as illustrated in FIG. 9, an SV 402/502/602 may broadcast for cell 1 a SIB that includes TACs for TA4 and possibly TA1, TA3, TA5, TA8 and/or TA9. Similarly, the SV 402/502/602 or another SV 402/502/602 may broadcast for Cell 2 a SIB that includes a TAC for TA12 only. The Cell 1 may be assigned to base station 1 (which has coverage of TA4, TA5, TA8, and TA9) and Cell 2 may be assigned to base station 2 (which has coverage of TA12, TA13, TA14, and TA15). Cell 1 and Cell 2 may be transferred from base station 1 to base station 2 or from base station 2 to base station 1 if the cell coverage area moves from one base station area to another.

The coverage area for a fixed TA may be defined in a manner that is simple, precise, flexible and requires minimal signaling for conveyance to a UE 405, a base station 406/502/607, or an entity in a CN 410. A fixed TA area may be small enough to allow efficient paging by comprising an area supported by just a few radio cells (e.g., less than 20) and may also be large enough to avoid excessive UE registration (e.g., may extend at least several kilometers in any direction). The shape of a fixed TA area may be arbitrary, e.g., the shape may be defined by a PLMN operator, or may have one or more restrictions. For example, one restriction for the shape of the fixed TA area may be that a fixed TA along the border of a country precisely aligns with the border to avoid serving UEs 405 in another country. Additionally, a fixed TA may be restricted to align with an area of interest, e.g., a PSAP serving area, the area of a large campus, etc. Additionally, a fixed TA may be restricted so that parts of the fixed TA align with a physical obstacle, such as the bank of a river or lake.

The coverage area for fixed cells may likewise be defined in a manner that is simple, precise, flexible and requires minimal signaling for conveyance to a UE 405 or base station 406/502/607. A fixed cell coverage area may allow for simple and precise association with a fixed TA, e.g., one fixed cell may belong unambiguously to one TA.

Fixed cells may be used by a wireless core network, such as a CN 410, for support of regulatory services such as emergency (EM) call routing based on a current fixed serving cell for a UE 405, use of a fixed cell to approximate a UE 405 location, use of a fixed cell association to direct a Wireless Emergency Alerting (WEA) alert over a small defined area to a recipient UE 405, or use of a fixed cell as an approximate location or a trigger event for Lawful Interception (LI) for a UE 405. Such usage of fixed cells implies that fixed cells should be capable of being defined with a size and shape similar to that of cells that are defined and used for terrestrial wireless access, including allowing for very small (e.g., pico) cells and large (e.g., rural) cells. As an example, fixed cells and/or fixed TAs may be defined using a regular array of grid points in which each grid point defines one fixed cell or one fixed TA as an area around the grid point containing all locations that are closer to that grid point than to any other grid point.

As described above, MIoT over Satellite Access is a feature in which automated devices with limited battery capability may periodically access remote sites. Open sky access to SVs and possibly non-guaranteed terrestrial cellular access may be supported. MIoT devices may have minimum battery lifetime requirements of multiple years, e.g., 2 years, 5 years, 10 years, etc. In some examples, the minimum lifetime requirement may be between 7-20 years, or more than 20 years. The devices may also have limited processing, signaling, or memory capability, and may not support global navigation satellite system (GNSS) self-location. Thus, a MIoT UE may not be able to perform PLMN selection using GNSS self-location, e.g., due to the constraint on battery lifetime and/or memory, signaling, or processing capability. The UE may be unable to determine its geographic location, and may access a radio cell supported by a satellite that provides coverage to more than one geographic location, e.g., more than one country. The aspects presented herein enable PLMN selection by the UE. The aspects described herein may enable the UE to select a set of potential PLMNs based on potential countries in which the UE may be located, and may enable the network to select a particular PLMN for the UE based on the actual location of the UE.

Figure 10:
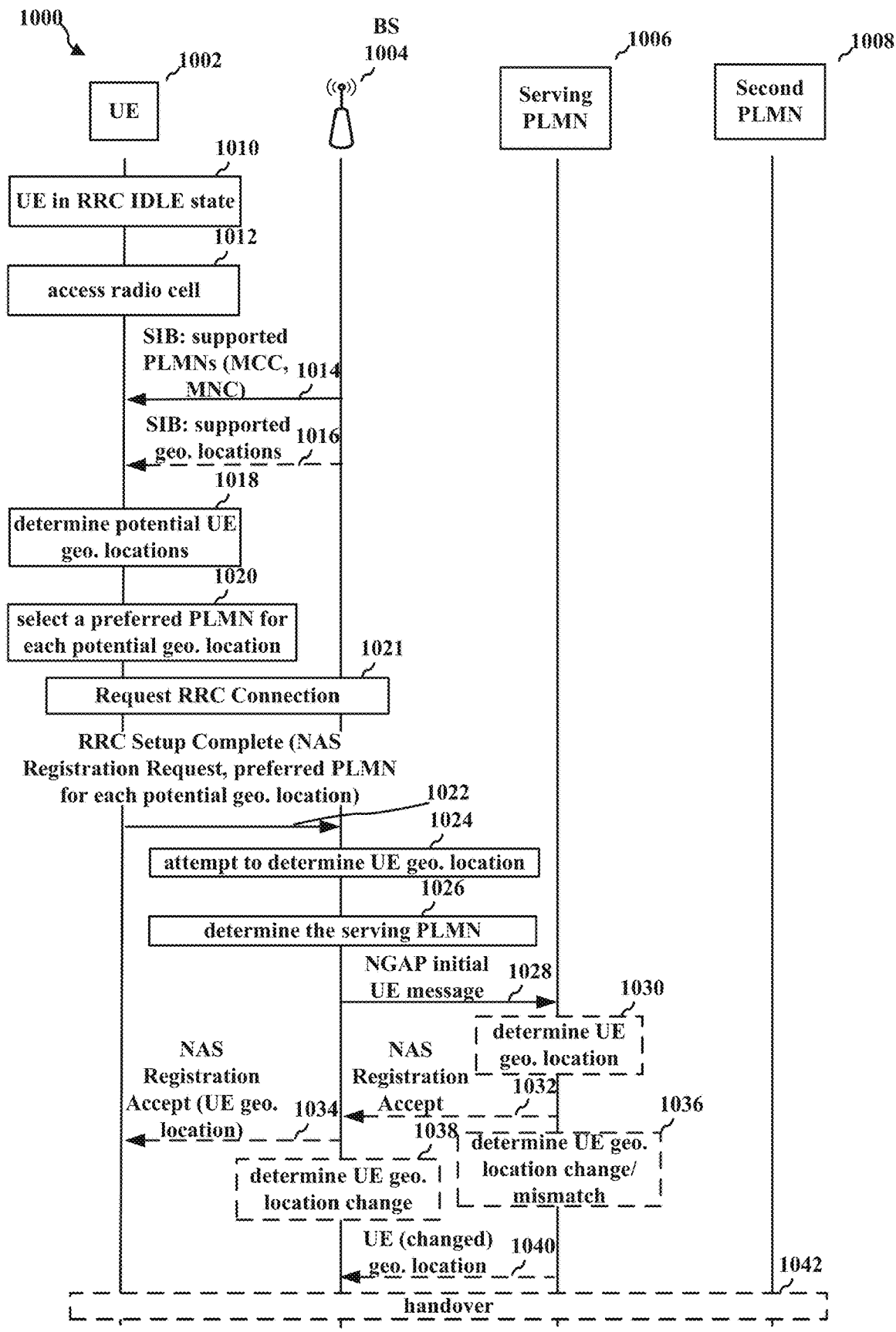
FIG. 10 is a communication flow of a method of wireless communication.

FIG. 10 is a communication flow 1000 of a method of wireless communication. The communication flow 1000 may be performed by entities in the wireless communications system and an access network 100 and/or in any of the network architectures 400, 500, or 600, in which the UE 1002 may correspond to the UE 104, the UE 405, the base station 1004 may correspond to the base station 102/180, the base station 406/502/602/607, and the serving PLMN 1006 or the second PLMN 1008 may correspond to the core network 190 (in particular, the AMF 192/193) or to any of the CNs 410 (in particular, the AMF 422).

At 1010, the UE 1002 may be in a Mobility Management DEREGISTERED state and an RRC IDLE state.

At 1012, the UE 1002 may access a radio cell supported by a communication satellite (e.g., an SV 402/502/602 and not shown in FIG. 10) to connect to the base station 1004.

At 1014, the base station 1004 may broadcast in SIBs (e.g., in a SIB1) via the communication satellite indications of supported PLMNs (e.g., a mobile country code (MCC)-mobile network code (MNC) combination for each PLMN) in the radio cell. The SIBs may indicate one or more PLMNs (referred to as supported PLMNs) supported by the base station 1004 in the radio cell. The PLMNs may each be identified in a SIB by an MCC and an MNC, where the MCC may indicate a geographic location for each identified PLMN (e.g., a country or international area to which each identified PLMN belongs). The base station may indicate one or more PLMNs per country. Hereinafter a country may also be referred to as a geographic location, and any reference to a country or a geographic location may also include reference to an international area not generally recognized as a country. Accordingly, the UE 1002 may receive in the broadcast SIBs via the communication satellite the indications of supported PLMNs in the radio cell.

At 1016, optionally, the base station 1004 may broadcast in SIBs (e.g., a SIB1) via the communication satellite an indication of geographic locations (e.g., a list of MCCs or some other list of country indications) for which coverage is provided in the radio cell. The indication of supported geographic locations may include a list of MCCs. Accordingly, the UE 1002 may receive in the broadcast SIBs via the communication satellite the indication of supported geographic locations in the radio cell.

At 1018, the UE 1002 may determine its potential geographic locations based on the indications received from the base station 1004 via the communication satellite. If 1016 was performed, the UE 1002 may know that it is located in one of the indicated geographic locations even when the UE 1002 has no geographic location determination capability, and the potential geographic locations of the UE 1002 may include the supported geographic locations in the radio cell, as indicated at 1016. If the optional indication of supported geographic locations in the radio cell is not received at 1016, the UE 1002 may determine that the UE 1002 is located in one of those geographic locations that have at least one PLMN supported in the radio cell, as indicated at 1014. For example, the UE 1002 may determine that the UE 1002 is located in one of the geographic locations (e.g., countries or an international area) indicated by the MCCs for supported PLMNs received in SIBs at 1014. The list of the potential geographic locations of the UE 1002 determined at 1018 may then be a union of the geographic locations associated with the MCCs of the PLMNs supported in the radio cell. For example, the base station 1004 may indicate at 1014 that three PLMNs are supported in the radio cell—two with an MCC associated with Geographic Location A and one with an MCC associated with Geographic Location B. Accordingly, the potential geographic locations of the UE 1002 may include Geographic Locations A and B. Relying on the list of supported PLMNs indicated at 1014 to determine the potential geographic locations of the UE 1002 may lead to the exclusion of one or more geographic locations when a geographic location is supported in the radio cell, but no PLMN whose MCC corresponds to that geographic location is supported.

At 1020, the UE 1002 may select a preferred PLMN for each potential geographic location of the UE 1002. The preferred PLMN may be selected based on PLMN priority information configured on a universal subscriber identity module (USIM) in UE 1002. For example, if the UE determines that the UE may be within country A, country B, or country C based on the MCC, MNC combinations indicated in the system information, the UE may select a PLMN 1 for country A, a PLMN 2 for country B, and a PLMN 3 for country C.

At 1021, the UE 1002 may request the establishment of an RRC Connection to base station 1004. For example, UE 1002 may perform a random access procedure to obtain initial access to the base station 1004 using the radio cell and may then send an RRC Setup Request message to base station 1004 using the radio cell. Base station 1004 may then return an RRC Setup message to UE 1002 indicating permission to proceed with the establishment of the RRC Connection in the radio cell.

At 1022, the UE 1002 may send an RRC Setup Complete message to the base station 1004 and may include a NAS message (e.g., a NAS Registration Request) in the RRC Setup Complete message. In the RRC Setup Complete message, the UE 1002 may also indicate to the base station 1004 the preferred PLMN selected at 1020 for each potential geographic location. For example, the UE 1002 may, for a potential geographic location, include an MCC indicating the potential geographic location followed by the MCC-MNC (or just the MNC if the MCC will be the same as that for the geographic location) of the preferred PLMN for that potential geographic location, e.g., the UE 1002 may indicate a PLMN 1 for a country A, a PLMN 2 for a country B, and a PLMN 3 for a country C.

At 1024, the base station 1004 may attempt to determine a geographic location in which the UE 1002 is currently located based on location information available for the UE 1002. The location information may include, but is not limited to, an identifier (ID) for the radio cell ID (e.g. which may enable a current coverage area of the radio cell to be obtained from local storage), a radio beam used by the UE 1002, location measurements (e.g. for Rx-Tx, RSRP, RSTD, AOD) provided by the UE 1002 in one of the RRC messages sent at 1021 or 1022, and/or location measurements (e.g. Rx-Tx, RSRP, AOA) of signals received from UE 1002 and obtained by the communication satellite or base station 1004.

At 1026, the base station 1004 may determine a serving PLMN 1006 for UE 1002. If the base station 1004 successfully determined at 1024 the geographic location of the UE 1002, the preferred PLMN for the geographic location as indicated by the UE 1002 at 1022 may be determined as the serving PLMN 1006. If the base station 1004 did not successfully determine at 1024 the geographic location of the UE 1002, the base station 1004 may select as the serving PLMN 1006 one of the preferred PLMNs indicated by the UE 1002 at 1022 (e.g., the first listed PLMN, a preferred PLMN for a most likely geographic location of UE 1002 such a geographic location for a majority or plurality of other UEs accessing the radio cell, or a random selection of a PLMN, etc.).

At 1028, the base station 1004 may continue with the RRC Connection establishment, and may forward, in an NGAP initial UE message, the NAS message (e.g., the NAS Registration Request message) received at 1022 to the serving PLMN 1006 determined at 1026. In case the base station 1004 did not successfully determine at 1024 the geographic location of the UE 1002, the base station 1004 may transmit to the serving PLMN 1006 (e.g., to an AMF 422 in serving PLMN 1006) in the NGAP initial UE message an optional indication that the geographic location of the UE 1002 is unverified.

At 1030, the serving PLMN 1006 (e.g., an AMF 422) may initiate geographic location determination for the UE 1002 (e.g., may initiate geographic location determination of UE 1002 by an LMF 424). 1030 may be optional and may only be performed when the NGAP initial UE message indicates that the geographic location of the UE 1002 is unverified.

Figure 11:
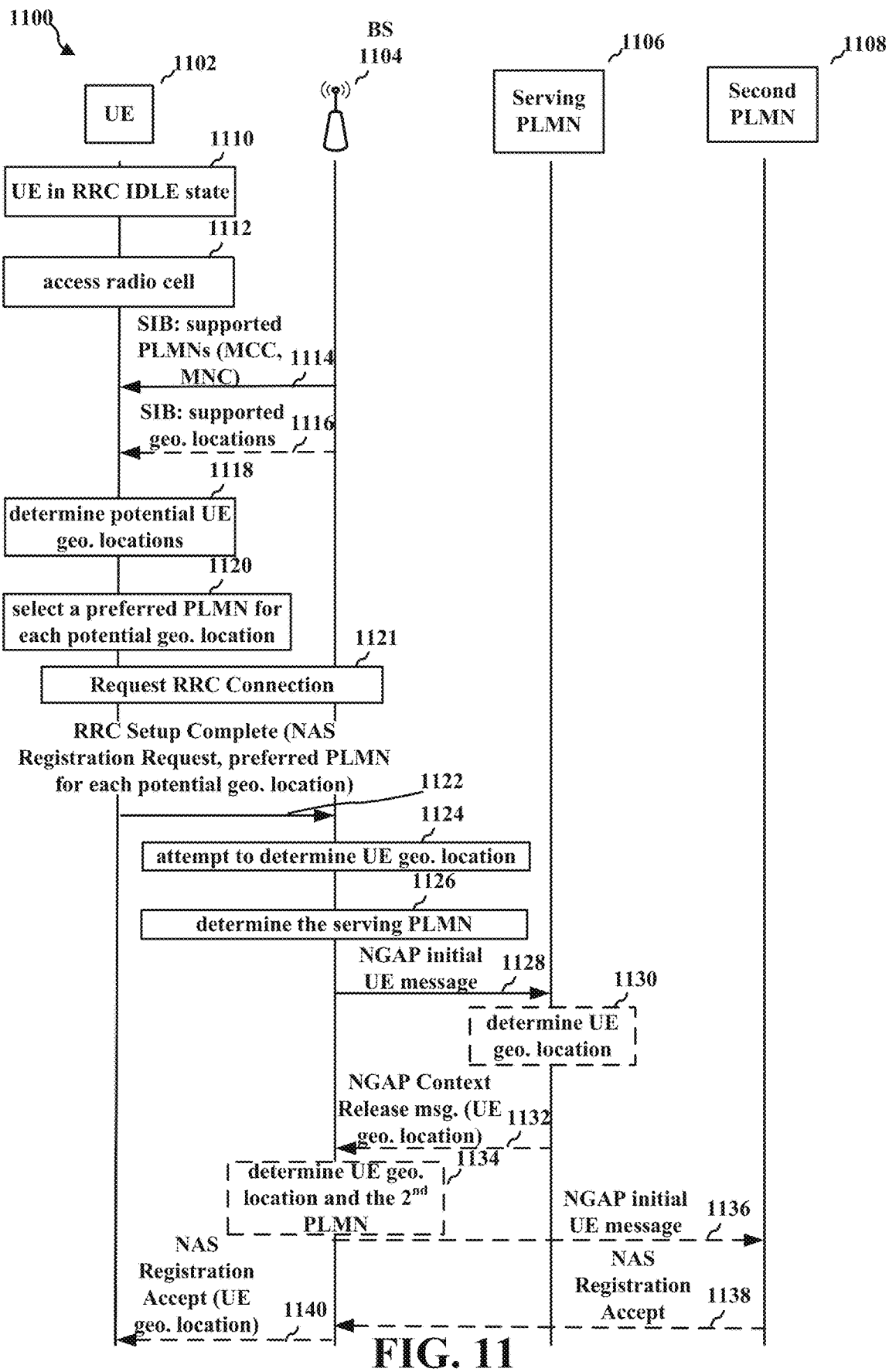
FIG. 11 is a communication flow of a method of wireless communication.

FIG. 10 illustrates scenarios where the serving PLMN 1006 first selected at 1026 correctly corresponds to and supports the geographic location of the UE 1002, or where at least initially the serving PLMN 1006 selected at 1026 cannot detect that the UE 1002 is not located in the supported geographic location. Scenarios where the base station cannot successfully determine the geographic location of the UE, but the serving PLMN 1006 first selected by the base station can detect that the UE is not located in the supported geographic location of the serving PLMN are illustrated in FIG. 11 below.

If the serving PLMN 1006 determines at 1030 that UE 1002 is located in the supported geographic location or cannot determine at 1030 the geographic location of the UE 1002, then, at 1032, the serving PLMN 1006 may transmit a NAS response (e.g., a NAS Registration Accept) to the base station 1004, which may be transferred in an NGAP Downlink NAS Transport message.

At 1034, the base station 1004 may forward the NAS response (e.g., the NAS Registration Accept) to the UE 1002, e.g., inside an RRC DL Information Transfer message. Further, either the base station 1004 or the serving PLMN 1006 (e.g., the AMF 422) may indicate to the UE 1002 at least one of the selected serving PLMN 1006 or the geographic location in which the UE 1002 is located.

At some later time at 1036, the serving PLMN 1006 may determine that the UE 1002 has changed the geographic location such that the UE 1002 is no longer located in the geographic location supported by the serving PLMN 1006, or that the UE 1002 is actually located in a geographic location not supported by the serving PLMN 1006 but the serving PLMN 1006 was initially not able to determine the geographic location of the UE 1002 at 1030.

At 1040, the serving PLMN 1006 may indicate the new (i.e., changed) or correct geographic location of the UE 1002 to the base station 1004, e.g., by sending an NGAP UE Context Release Command message to base station 1004 with the new geographic location for UE 1002.

In addition or as an alternative to 1036 and 1040, at 1038, the base station 1004 may determine by itself that the UE 1002 has changed the geographic location.

At 1042, the base station 1004 may, if possible, perform a handover of the UE 1002 to a second PLMN 1008 (e.g., to an AMF in the second PLMN 1008). The second PLMN 1008 may be determined by the base station 1004 as the preferred PLMN for the new geographic location of the UE 1002 that was selected by the UE at 1020 and indicated to the base station 1004 at 1022. Accordingly, signaling and processing resource consumption in the UE 1002 associated with the change to the second PLMN may be reduced.

FIG. 11 is a communication flow 1100 of a method of wireless communication. The communication flow 1100 may be performed by entities in the wireless communications system and access network 100 or in the network architectures 400, 500, or 600, in which the UE 1102 may correspond to the UE 104 or the UE 405, the base station 1104 may correspond to the base station 102/180 or the base station 406/502/602/607, and the serving PLMN 1106 or the second PLMN 1108 may correspond to the core network 190 (in particular, the AMF 192/193) or any of the CNs 410 (in particular, the AMF 422). The communication flow 1100 may differ from the communication flow 1000 in that in the communication flow 1100, the serving PLMN may, upon receiving the NGAP initial UE message, determine that the UE is located in a geographic location not supported by the serving PLMN, whereas in the communication flow 1000, the serving PLMN may, upon receiving the NGAP initial UE message, determine that the UE is located in the geographic location supported by the serving PLMN, or may initially fail to determine the geographic location of the UE. Accordingly, operations 1110-1130 may be similar to, or the same as, operations 1010-1030.

At 1110, the UE 1102 may be in a 5GMM DEREGISTERED state and an RRC IDLE state.

At 1112, the UE 1102 may access a radio cell supported by a communication satellite (e.g., an SV 402/502/602 and not shown in FIG. 11) to connect to the base station 1104.

At 1114, the base station 1104 may broadcast in SIBs (e.g., in a SIB1) via the communication satellite indications of supported PLMNs (e.g., an MCC-MNC combination for each PLMN) in the radio cell. The SIBs may indicate one or more PLMNs (referred to as supported PLMNs) supported by the base station 1104 in the radio cell. The PLMNs may each be identified in a SIB by an MCC and an MNC, where the MCC may indicate a geographic location for each identified PLMN (e.g., a country or international area to which each identified PLMN belongs). The base station may indicate one or more PLMNs per country. Hereinafter a country may also be referred to as a geographic location, and any reference to a country or a geographic location may also include reference to an international area not generally recognized as a country. Accordingly, the UE 1102 may receive in the broadcast SIBs via the communication satellite the indications of supported PLMNs in the radio cell.

At 1116, optionally, the base station 1104 may broadcast in SIBs (e.g., a SIB1) via the communication satellite an indication of geographic locations (e.g., a list of MCCs or some other list of country indications) for which coverage is provided in the radio cell. The indication of supported geographic locations may include a list of MCCs. Accordingly, the UE 1102 may receive in the broadcast SIBs via the communication satellite the indication of supported geographic locations in the radio cell.

At 1118, the UE 1102 may determine its potential geographic locations based on the indications received from the base station 1104 via the communication satellite. If 1116 was performed, the UE 1102 may know that it is located in one of the indicated geographic locations even when the UE 1102 has no geographic location determination capability, and the potential geographic locations of the UE 1102 may include the supported geographic locations in the radio cell, as indicated at 1116. If the optional indication of supported geographic locations in the radio cell is not received at 1116, the UE 1102 may determine that the UE 1102 is located in one of those geographic locations that have at least one PLMN supported in the radio cell, as indicated at 1114. For example, the UE 1102 may determine that the UE 1102 is located in one of the geographic locations (e.g. countries or an international area) indicated by the MCCs for supported PLMNs received in SIBs at 1114. The list of the potential geographic locations of the UE 1102 determined at 1118 may then be a union of the geographic locations associated with the MCCs of the PLMNs supported in the radio cell. For example, the base station 1104 may indicate at 1114 that three PLMNs are supported in the radio cell—two with an MCC associated with Geographic Location A and one with an MCC associated with Geographic Location B. Accordingly, the potential geographic locations of the UE 1102 may include Geographic Locations A and B. Relying on the list of supported PLMNs indicated at 1114 to determine the potential geographic locations of the UE 1102 may lead to the exclusion of one or more geographic locations when a geographic location is supported in the radio cell, but no PLMN whose MCC corresponds to that geographic location is supported.

At 1120, the UE 1102 may select a preferred PLMN for each potential geographic location of the UE 1102. The preferred PLMN may be selected based on PLMN priority information configured on a USIM in UE 1102.

At 1121, the UE 1102 may request the establishment of an RRC Connection to base station 1104. For example, UE 1102 may perform a random access procedure to obtain initial access to the base station 1104 using the radio cell and may then send an RRC Setup Request message to base station 1104 using the radio cell. Base station 1104 may then return an RRC Setup message to UE 1102 indicating permission to proceed with the establishment of the RRC Connection in the radio cell.

At 1122, the UE 1102 may send an RRC Setup Complete message to the base station 1104 and may include a NAS message (e.g., a NAS Registration Request) in the RRC Setup Complete message. In the RRC Setup Complete message, the UE 1102 may also indicate to the base station 1104 the preferred PLMN selected at 1120 for each potential geographic location. For example, the UE 1102 may, for a potential geographic location, indicate an MCC indicating the potential geographic location followed by the MCC-MNC (or just the MNC if the MCC will be the same as that for the geographic location) of the preferred PLMN for that potential geographic location.

At 1124, the base station 1104 may attempt to determine a geographic location in which the UE 1102 is currently located based on location information available for the UE 1102. The location information may include, but is not limited to, an identifier (ID) for the radio cell ID (e.g. which may enable a current coverage area of the radio cell to be obtained from local storage), a radio beam used by the UE 1102, location measurements (e.g. for Rx-Tx, RSRP, RSTD, AOD) provided by the UE 1102 in one of the RRC messages sent at 1121 or 1122, and/or location measurements (e.g. Rx-Tx, RSRP, AOA) of signals received from UE 1102 and obtained by the communication satellite or base station 1104.

At 1126, the base station 1104 may determine a serving PLMN 1106 for UE 1102. If the base station 1104 successfully determined at 1124 the geographic location of the UE 1102, the preferred PLMN for the geographic location as indicated by the UE 1102 at 1122 may be determined as the serving PLMN 1106. If the base station 1104 did not successfully determine at 1124 the geographic location of the UE 1102, the base station 1104 may select as the serving PLMN 1106 one of the preferred PLMNs indicated by the UE 1102 at 1122 (e.g., the first listed PLMN, a preferred PLMN for a most likely geographic location of UE 1102 such a geographic location for a majority or plurality of other UEs accessing the radio cell, or a random selection of a PLMN, etc.).

At 1128, the base station 1104 may continue with the RRC Connection establishment and may forward, in an NGAP initial UE message, the NAS message (e.g., the NAS Registration Request message) received at 1122 to the serving PLMN 1106 determined at 1126. In case the base station 1104 did not successfully determine at 1124 the geographic location of the UE 1102, the base station 1104 may transmit to the serving PLMN 1106 (e.g., to an AMF 422 in serving PLMN 1106) in the NGAP initial UE message an optional indication that the geographic location of the UE 1102 is unverified.

At 1130, the serving PLMN 1106 (e.g. the AMF 422) may initiate geographic location determination for the UE 1102 (e.g., may initiate geographic location determination of UE 1102 by an LMF 424). 1130 may be optional and may only be performed when the NGAP initial UE message indicates that the geographic location of the UE 1102 is unverified.

As mentioned above, FIG. 11 illustrates scenarios where the base station 1104 cannot successfully determine the geographic location of the UE at 1124, but the serving PLMN 1106 first selected by the base station 1104 can detect that the UE 1102 is not located in the supported geographic location of the serving PLMN 1106.

If the serving PLMN 1106 determines at 1130 that the UE 1102 is not located in a supported geographic location of the serving PLMN 1106, at 1132, the serving PLMN 1106 (e.g., the AMF 422) may transmit an NGAP Context Release message (e.g., an NGAP Context Release Command message) to the base station 1104. In the NGAP Context Release message, the serving PLMN 1106 (e.g., the AMF 422) may include the geographic location of the UE 1102 as determined at 1130.

At 1134, similar to at 1124, and as an optional action, the base station 1104 may again determine the geographic location of the UE 1102, with the added benefit of the UE geographic location information received at 1132 from the serving PLMN at 1106. Further, the base station 1104 may determine a second PLMN 1108 based on a correct geographic location of the UE 1102, as received at 1132 or determined or verified at 1134. The second PLMN 1108 may be the preferred PLMN for the correct geographic location of the UE 1102 that was selected by the UE at 1120 and indicated to the base station 1104 at 1122. The base station 1104 may determine or verify the correct geographic location of the UE 1102 and determine the second PLMN 1108 at 1134 without notifying the UE 1102. The UE 1102 may thus not be aware of the initial error in the PLMN selection, and accordingly little to no additional resources may be used at the UE 1102 due to the initial error in the PLMN selection.

At 1136, the base station 1104 may forward, in another NGAP initial UE message, the NAS message (e.g., the NAS Registration Request message) received at 1122 to the second PLMN 1108 determined at 1134 (e.g., to an AMF 422 in the second PLMN 1108).

At 1138, the second PLMN 1108 may transmit a NAS response (e.g., a NAS Registration Accept) to the base station 1104, which may be transferred in an NGAP Downlink NAS Transport message.

At 1140, the base station 1104 may forward the NAS response (e.g., the NAS Registration Accept) to the UE 1102, e.g., inside an RRC DL Information Transfer message. Further, either the base station 1104 or the second PLMN 1108 (e.g., an AMF 422) may indicate to the UE 1102 at least one of the selected second PLMN 1108 or the geographic location in which the UE 1102 is located.

Figure 12:
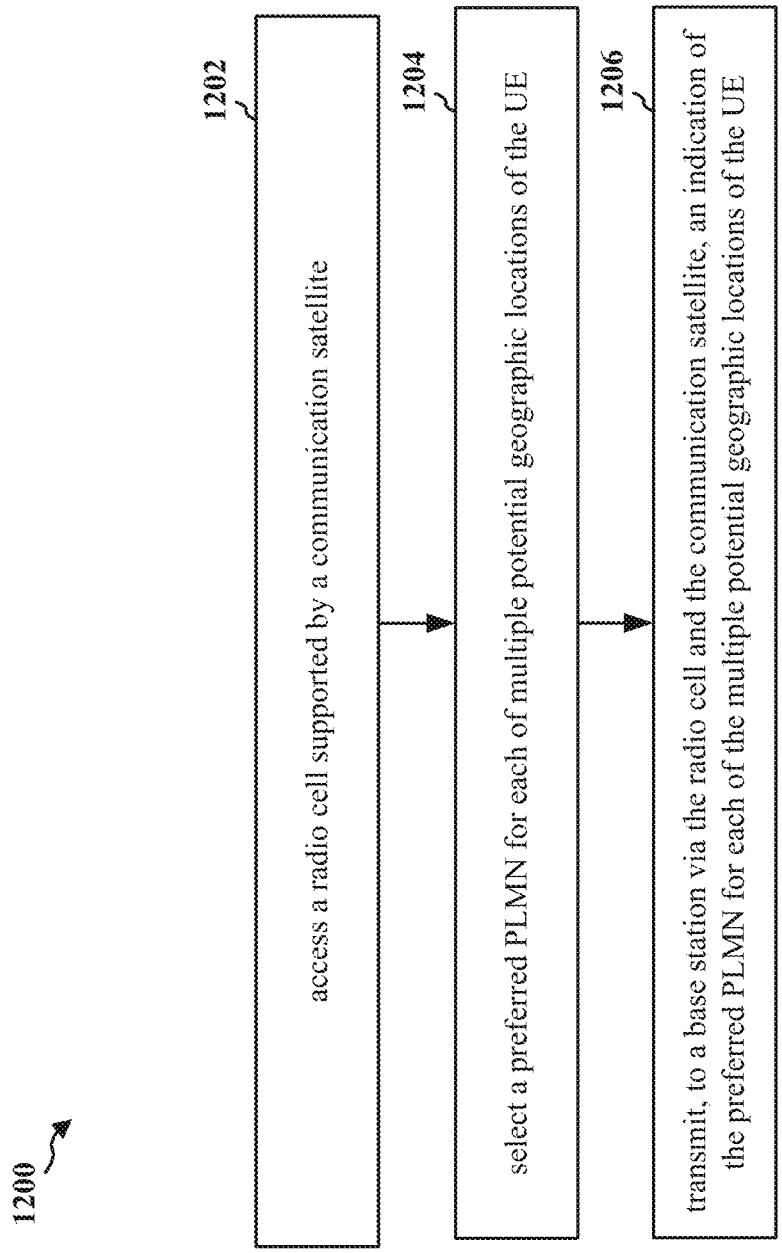
FIG. 12 is a flowchart of a method of wireless communication.

FIG. 12 is a flowchart 1200 of a method of supporting satellite wireless access by a user equipment (UE) to a serving public land mobile network (PLMN). The method may be performed by the UE (e.g., the UE 104; the UE 405; the UE 1002/1102; the apparatus 1502). At 1202, the UE may access a radio cell supported by a communication satellite (e.g., an SV 402, 502 or 602). For example, 1202 may be performed by the radio cell component 1540 in FIG. 15. For example, at 1012 in FIG. 10 and at 1112 in FIG. 11, the UE 1002/1102 may access a radio cell supported by a communication satellite.

At 1204, the UE may select a preferred PLMN for each of multiple potential geographic locations of the UE. For example, 1204 may be performed by the selection component 1542 in FIG. 15. For example, at 1020 in FIG. 10 and at 1120 in FIG. 11, the UE 1002/1102 may select a preferred PLMN for each of multiple potential geographic locations of the UE 1002/1102.

At 1206, the UE may transmit, to a base station (e.g., a base station 406, 502 or 607) via the radio cell and the communication satellite, an indication of the preferred PLMN for each of the multiple potential geographic locations of the UE. For example, 1206 may be performed by the indication component 1544 in FIG. 15. For example, at 1022 in FIG. 10 and at 1122 in FIG. 11, the UE 1002/1102 may transmit, to the base station 1004/1104 via the radio cell and the communication satellite, an indication of the preferred PLMN for each of the multiple potential geographic locations of the UE 1002/1102.

In one configuration, for each of the multiple potential geographic locations of the UE, the indication of the preferred PLMN may include an MNC. In one configuration, the indication of the preferred PLMN may further include an MCC. In one configuration, each of the multiple potential geographic locations may include a country or an international area.

In one configuration, the UE may receive system information via the radio cell indicating available PLMNs. The available PLMNs may provide coverage to the multiple potential geographic locations of the UE. The system information may include an MCC and an MNC for each of the available PLMNs. For example, at 1014 in FIG. 10 and at 1114 in FIG. 11, the UE 1002/1102 may receive system information via the radio cell indicating available PLMNs. The UE may select the preferred PLMN for each of the multiple potential geographic locations of the UE from among the available PLMNs. For example, at 1020 in FIG. 10 and at 1120 in FIG. 11, the UE 1002/1102 may select the preferred PLMN for each of the multiple potential geographic locations of the UE 1002/1102 from among the available PLMNs. In one configuration, determining the multiple potential geographic locations of the UE may be based on the MCCs of the available PLMNs included in the system information.

In one configuration, the UE may receive via the radio cell, in system information, a coverage indication indicating multiple geographic areas having coverage by the radio cell. For example, at 1016 in FIG. 10 and at 1116 in FIG. 11, the UE 1002/1102 may receive via the radio cell, in system information, a coverage indication indicating multiple geographic areas having coverage by the radio cell. Each of the multiple geographic areas may include a country or an international area. The UE may determine the multiple potential geographic locations of the UE based on the multiple geographic areas indicated in the coverage indication. For example, at 1018 in FIG. 10 and at 1118 in FIG. 11, the UE 1002/1102 may determine the multiple potential geographic locations of the UE 1002/1102 based on the multiple geographic areas indicated in the coverage indication.

In one configuration, the UE may select the preferred PLMN for each of the multiple potential geographic locations of the UE using priority information included in the UE, e.g., included in a USIM of the UE.

In one configuration, the base station may determine a current geographic location of the UE. The base station may determine the serving PLMN based on the indication of the preferred PLMN received from the UE for the current geographic location of the UE.

In one configuration, the base station may be part of the communication satellite (e.g., may be part of an SV 502). In one configuration, the base station may be a terrestrial base station (e.g., a base station 406). In one configuration, the communication satellite may include a DU (e.g., may be an SV 602) and the base station may include a terrestrial CU (e.g., may be a base station 607).

Figure 13:
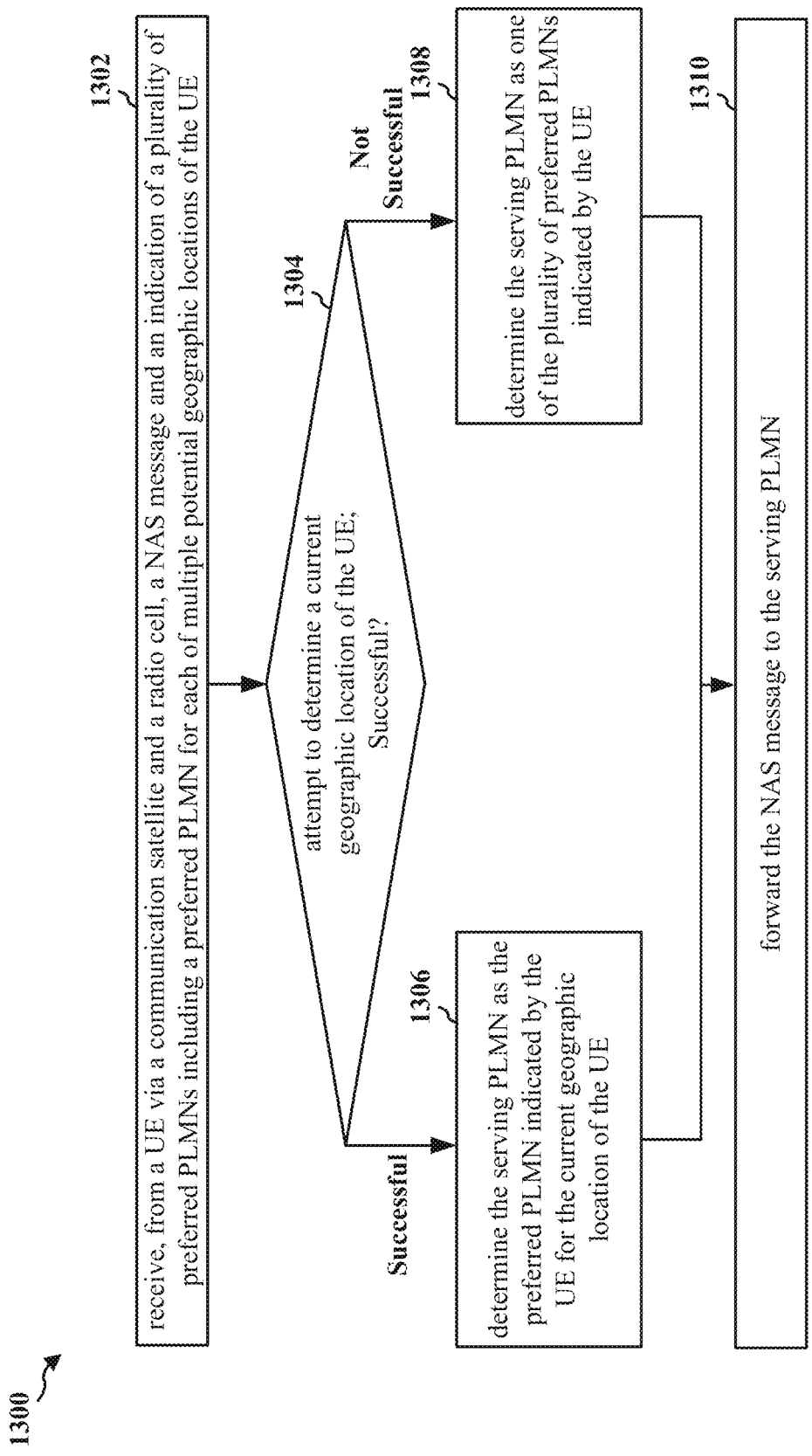
FIG. 13 is a flowchart of a method of wireless communication.

FIG. 13 is a flowchart 1300 of a method of supporting satellite wireless access by a user equipment (e.g., a UE 405) to a serving public land mobile network (PLMN). The method may be performed by a base station (e.g., the base station 102/180; the base station 406/502/602/607; the base station 1004/1104; the apparatus 1602). At 1302, the base station may receive, from the UE via a communication satellite (e.g., an SV 402, 502 or 602) and a radio cell, a NAS message (e.g., a NAS Registration Request message) and an indication of a plurality of preferred PLMNs including a preferred PLMN for each of multiple potential geographic locations of the UE. For example, 1302 may be performed by the NAS component 1640 in FIG. 16. For example, at 1022 in FIG. 10 and at 1122 in FIG. 11, the base station 1004/1104 may receive, from the UE 1002/1102 via a communication satellite and a radio cell, a NAS message and an indication of a plurality of preferred PLMNs including a preferred PLMN for each of multiple potential geographic locations of the UE 1002/1102.

At 1304, the base station may attempt to determine a current geographic location of the UE. For example, 1304 may be performed by the location component 1642 in FIG. 16. For example, at 1024 in FIG. 10 and at 1124 in FIG. 11, the base station 1004/1104 may attempt to determine a current geographic location of the UE 1002/1102.

When the attempt to determine the current geographic location of the UE is successful, at 1306, the base station may determine the serving PLMN as the preferred PLMN indicated by the UE for the current geographic location of the UE. For example, 1306 may be performed by the first serving PLMN component 1644 in FIG. 16. For example, at 1026 in FIG. 10 and at 1126 in FIG. 11, the base station 1004/1104 may determine the serving PLMN as the preferred PLMN indicated by the UE 1002/1102 for the current geographic location of the UE 1002/1102 when the attempt to determine the current geographic location of the UE is successful.

When the attempt to determine the current geographic location of the UE is not successful, at 1308, the base station may determine the serving PLMN as one of the plurality of preferred PLMNs indicated by the UE. For example, 1308 may be performed by the second serving PLMN component 1646 in FIG. 16. For example, at 1026 in FIG. 10 and at 1126 in FIG. 11, the base station 1004/1104 may determine the serving PLMN as one of the plurality of preferred PLMNs indicated by the UE 1002/1102 when the attempt to determine the current geographic location of the UE 1002/1102 is not successful.

At 1310, the base station may forward the NAS message to the serving PLMN (e.g., to an AMF 422 in the serving PLMN). For example, 1310 may be performed by the forwarding component 1648 in FIG. 16. For example, at 1028 in FIG. 10 and at 1128 in FIG. 11, the base station 1004/1104 may forward the NAS message to the serving PLMN 1006/1106.

In one configuration, the current geographic location of the UE may include a country or an international area in which the UE is currently located.

In one configuration, the base station may transmit, in system information for the radio cell, a coverage indication indicating multiple geographic areas having coverage by the radio cell. For example, at 1016 in FIG. 10 and at 1116 in FIG. 11, the base station 1004/1104 may transmit, in system information for the radio cell, a coverage indication indicating multiple geographic areas having coverage by the radio cell. Each of the multiple geographic areas may include a country or an international area.

In one configuration, the base station may receive a NAS response message (e.g., a NAS Registration Accept message) from the serving PLMN (e.g., from an AMF 422 in the serving PLMN). For example, at 1032 in FIG. 10, the base station 1004 may receive a NAS response message from the serving PLMN 1006. The base station may forward the NAS response message to the UE with an indication of at least one of the serving PLMN or the current geographic location of the UE. For example, at 1034 in FIG. 10, the base station 1004 may forward the NAS response message to the UE 1002 with an indication of at least one of the serving PLMN 1006 or the current geographic location of the UE 1002.

In one configuration, the base station may receive from the serving PLMN an indication that the UE is not located in a geographic location supported by the serving PLMN. For example, at 1040 in FIG. 10 and at 1132 in FIG. 11, the base station 1004/1104 may receive from the serving PLMN 1106/1106 an indication that the UE 1002/1102 is not located in a geographic location supported by the serving PLMN 1006/1106. The base station may determine a second PLMN from the plurality of preferred PLMNs indicated by the UE. For example, at 1134 in FIG. 11, the base station 1104 may determine a second PLMN 1108 from the plurality of preferred PLMNs indicated by the UE 1102. The base station may forward the NAS message to the second PLMN (e.g., to an AMF 422 in the second PLMN). For example, at 1136 in FIG. 11, the base station 1104 may forward the NAS message to the second PLMN 1108. In one configuration, the base station may receive an indication from the serving PLMN of a second geographic location at which the UE is currently located. For example, at 1040 in FIG. 10 and at 1132 in FIG. 11, the base station 1004/1104 may receive an indication from the serving PLMN 1006/1106 of a second geographic location at which the UE 1002/1102 is currently located. The base station may determine the second PLMN as the preferred PLMN indicated by the UE for the second geographic location. For example, at 1134 in FIG. 11, the base station 1104 may determine the second PLMN 1108 as the preferred PLMN indicated by the UE for the second geographic location.

In one configuration, the base station may receive from the serving PLMN an indication indicating that the UE has moved to a second geographic location not supported by the serving PLMN. For example, at 1040 in FIG. 10, the base station 1004 may receive from the serving PLMN 1006 an indication indicating that the UE 1002 has moved to a second geographic location not supported by the serving PLMN 1006. The base station may determine a second PLMN as the preferred PLMN indicated by the UE for the second geographic location of the UE. The base station may perform a handover of the UE to the second PLMN. For example, at 1042 in FIG. 10, the base station 1004 may determine the second PLMN 1008 and perform a handover of the UE 1002 to the second PLMN 1008.

In one configuration, the base station may determine that the UE has moved to a second geographic location not supported by the serving PLMN. For example, at 1038 in FIG. 10, the base station 1004 may determine that the UE 1002 has moved to a second geographic location not supported by the serving PLMN 1006. The base station may determine a second PLMN as the preferred PLMN indicated by the UE for the second geographic location of the UE. The base station may perform a handover of the UE to the second PLMN. For example, at 1042 in FIG. 10, the base station 1004 may determine the second PLMN 1008 and perform a handover of the UE 1002 to the second PLMN 1008.

In one configuration, the base station may be part of the communication satellite (e.g., an SV 502). In one configuration, the base station may be a terrestrial base station (e.g., a base station 406). In one configuration, the communication satellite may include a DU (e.g., may be an SV 602) and the base station may include a terrestrial CU (e.g., may be a base station 607).

Figure 14:
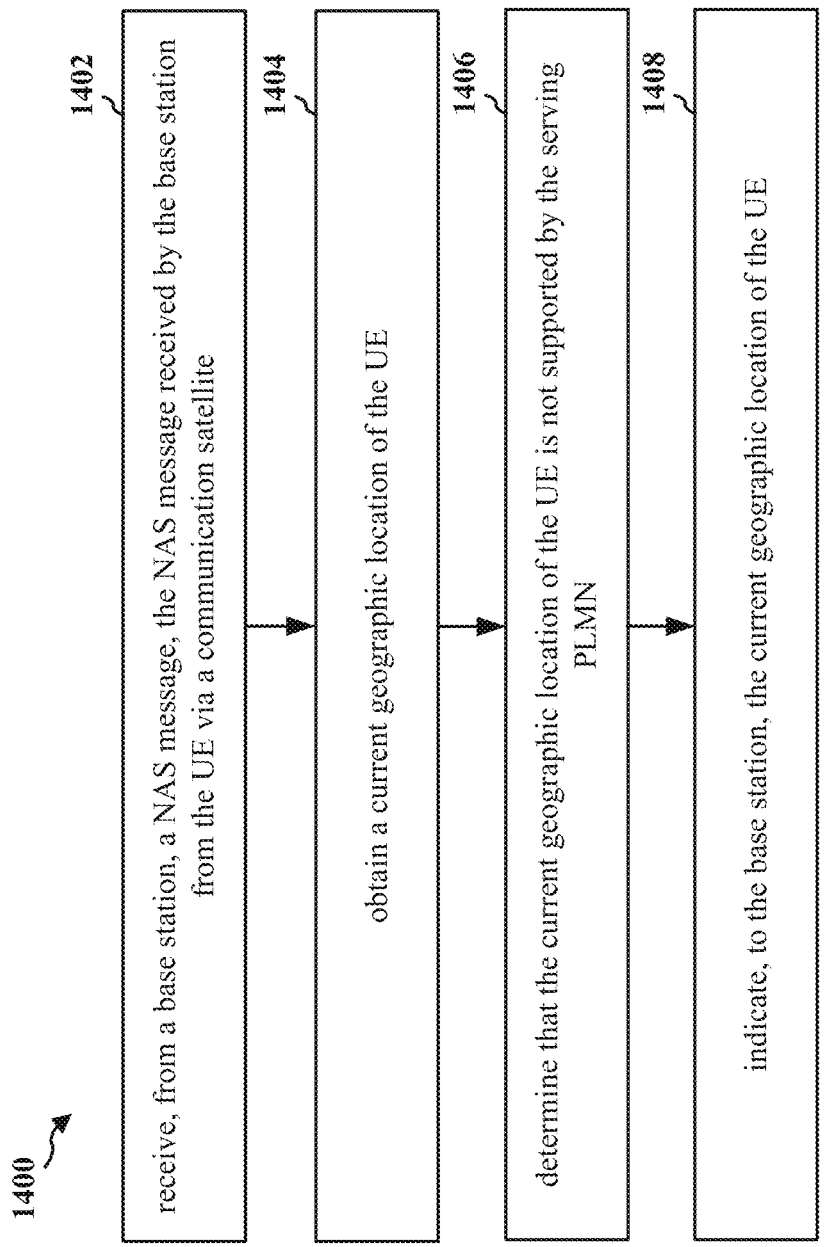
FIG. 14 is a flowchart of a method of wireless communication.

FIG. 14 is a flowchart 1400 of a method of supporting satellite wireless access by a user equipment (e.g., a UE 405) to a serving public land mobile network (PLMN). The method may be performed by a network node of the serving PLMN, and in particular, an AMF (e.g., the AMF 192/193 in the core network 190; the AMF 422 in the 5GCN 410, the serving PLMN 1006/1106; the second PLMN 1008/1108; the apparatus 1702). At 1402, the network node of the PLMN may receive, from a base station (e.g., a base station 406, 502 or 607) a NAS message (e.g., a NAS Registration Request message). The NAS message may have been received by the base station from the UE via a communication satellite (e.g., an SV 402, 502 or 602). For example, 1402 may be performed by the NAS component 1740 in FIG. 17. For example, at 1028 in FIG. 10 and at 1128 in FIG. 11, the network node of the serving PLMN 1006/1108 may receive, from a base station 1004/1104 a NAS message.

At 1404, the network node of the PLMN may obtain a current geographic location of the UE. For example, 1404 may be performed by the location component 1742 in FIG. 17. For example, at 1030 in FIG. 10 and at 1130 in FIG. 11, the network node of the serving PLMN 1006/1106 may obtain a current geographic location of the UE 1002/1102.

At 1406, the network node of the PLMN may determine that the current geographic location of the UE is not supported by the serving PLMN. For example, 1406 may be performed by the support component 1744 in FIG. 17. For example, at 1036 in FIG. 10 and at 1130 in FIG. 11, the network node of the serving PLMN 1006/1106 may determine that the current geographic location of the UE 1002/1102 is not supported by the serving PLMN 1006/1106.

At 1408, the network node of the PLMN may indicate, to the base station, the current geographic location of the UE. For example, 1408 may be performed by the indication component 1746 in FIG. 17. For example, at 1040 in FIG. 10 and at 1132 in FIG. 11, the network node of the serving PLMN 1006/1106 may indicate, to the base station 1004/1104, the current geographic location of the UE 1002/1102.

In one configuration, the network node may indicate the current geographic location of the UE in an NGAP Context Release Command message. For example, at 1132 in FIG. 11 the network node of the serving PLMN 1106 may indicate the current geographic location of the UE 1102 in an NGAP Context Release Command message.

In one configuration, the base station may determine a second PLMN. The second PLMN may support the current geographic location of the UE. The base station may forward the NAS message to the second PLMN.

In one configuration, the network node may obtain the current geographic location of the UE from a location server (e.g., an LMF 424). In one configuration, the network node may comprise an AMF (e.g., an AMF 422).

Figure 15:
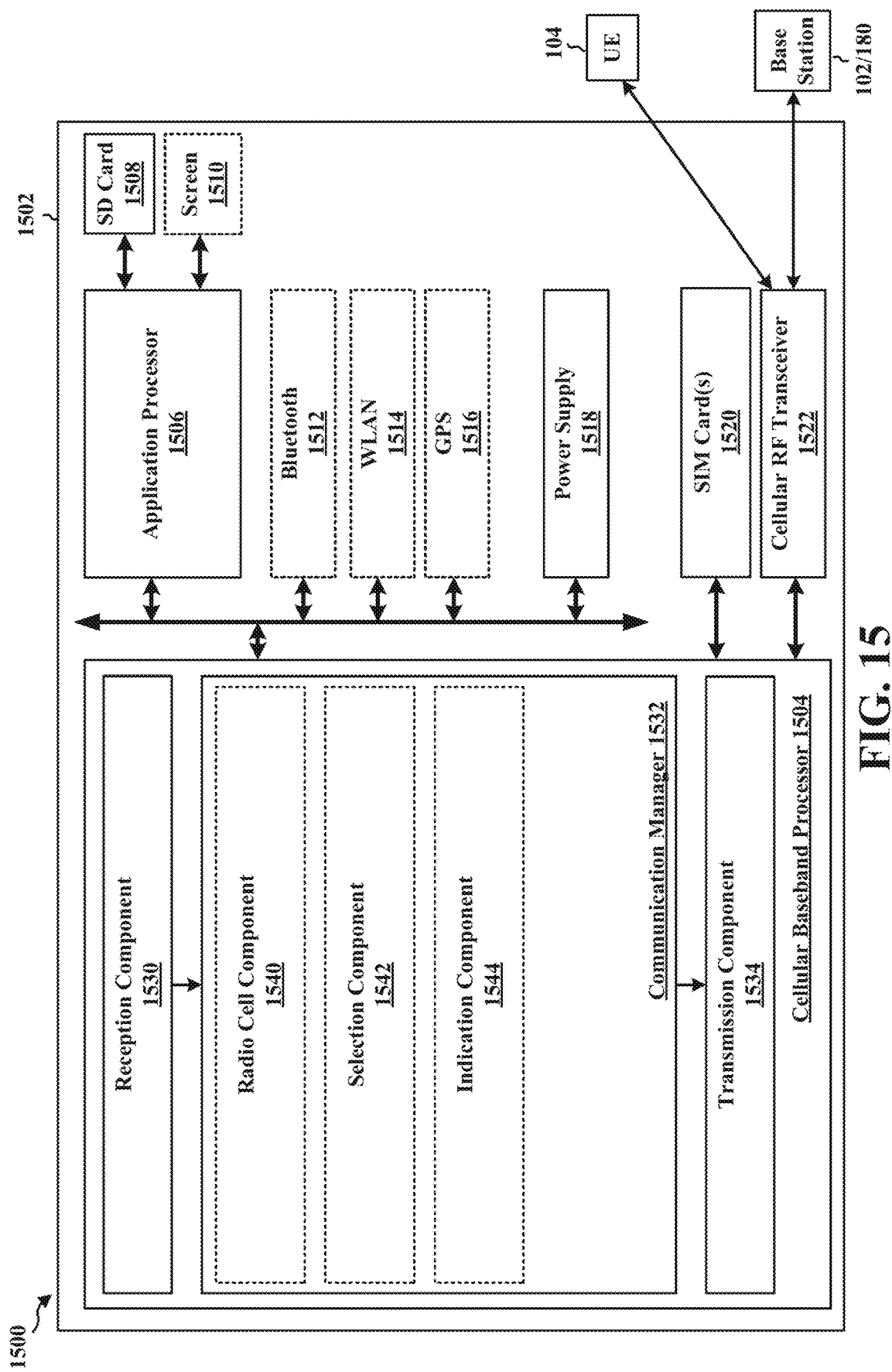
FIG. 15 is a diagram illustrating an example of a hardware implementation for an example apparatus.

FIG. 15 is a diagram 1500 illustrating an example of a hardware implementation for an apparatus 1502. The apparatus 1502 is a UE (e.g., a UE 405 or a UE 104) and includes a cellular baseband processor 1504 (also referred to as a modem) coupled to a cellular RF transceiver 1522 and one or more subscriber identity modules (SIM) cards 1520, and a power supply 1518. The apparatus 1502 may further include any of an application processor 1506 coupled to a secure digital (SD) card 1508 and a screen 1510, a Bluetooth module 1512, a wireless local area network (WLAN) module 1514, or a Global Positioning System (GPS) module 1516. The cellular baseband processor 1504 communicates through the cellular RF transceiver 1522 with the UE 104 and/or BS 102/180. The apparatus 1502 may communicate with the base station 102/180 via satellite access. The cellular baseband processor 1504 may include a computer-readable medium/memory. The computer-readable medium/memory may be non-transitory. The cellular baseband processor 1504 is responsible for general processing, including the execution of software stored on the computer-readable medium/memory. The software, when executed by the cellular baseband processor 1504, causes the cellular baseband processor 1504 to perform the various functions described supra. The computer-readable medium/memory may also be used for storing data that is manipulated by the cellular baseband processor 1504 when executing software. The cellular baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the cellular baseband processor 1504. The cellular baseband processor 1504 may be a component of the UE 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see 350 of FIG. 3) and include the additional modules of the apparatus 1502.

The communication manager 1532 includes a radio cell component 1540 that is configured to access a radio cell supported by a communication satellite, e.g., as described in connection with 1202 in FIG. 12. The communication manager 1532 further includes a selection component 1542 that is configured to select a preferred PLMN for each of multiple potential geographic locations of the UE, e.g., as described in connection with 1204 in FIG. 12. The communication manager 1532 further includes an indication component 1544 that is configured to transmit, to a base station via the radio cell and the communication satellite, an indication of the preferred PLMN for each of the multiple potential geographic locations of the UE, e.g., as described in connection with 1206 in FIG. 12.

The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the cellular baseband processor 1504, includes means for accessing a radio cell supported by a communication satellite. The apparatus 1502 may include means for selecting a preferred PLMN for each of multiple potential geographic locations of the UE. The apparatus 1502 may include means for transmitting, to a base station via the radio cell and the communication satellite, an indication of the preferred PLMN for each of the multiple potential geographic locations of the UE.

In one configuration, for each of the multiple potential geographic locations of the UE, the indication of the preferred PLMN may include an MNC. In one configuration, the indication of the preferred PLMN may further include an MCC. In one configuration, each of the multiple potential geographic locations may include a country or an international area. In one configuration, the apparatus 1502 may include means for receiving system information via the radio cell indicating available PLMNs. The available PLMNs may provide coverage to the multiple potential geographic locations of the UE. The system information may include an MCC and an MNC for each of the available PLMNs. The apparatus 1502 may include means for selecting the preferred PLMN for each of the multiple potential geographic locations of the UE from among the available PLMNs. In one configuration, determining the multiple potential geographic locations of the UE may be based on the MCCs of the available PLMNs included in the system information. In one configuration, the apparatus 1502 may include means for receiving via the radio cell, in system information, a coverage indication indicating multiple geographic areas having coverage by the radio cell. Each of the multiple geographic areas may include a country or an international area. The UE may determine the multiple potential geographic locations of the UE based on the multiple geographic areas indicated in the coverage indication. In one configuration, the apparatus 1502 may include means for selecting the preferred PLMN for each of the multiple potential geographic locations of the UE using priority information included in a USIM of the UE. In one configuration, the base station may determine a current geographic location of the UE. The base station may determine the serving PLMN based on the indication of the preferred PLMN received from the UE for the current geographic location of the UE. In one configuration, the base station may be part of the communication satellite. In one configuration, the base station may be a terrestrial base station. In one configuration, the communication satellite may include a DU and the base station may include a terrestrial CU.

The aforementioned means may be one or more of the aforementioned components of the apparatus 1502 configured to perform the functions recited by the aforementioned means. As described supra, the apparatus 1502 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 16:
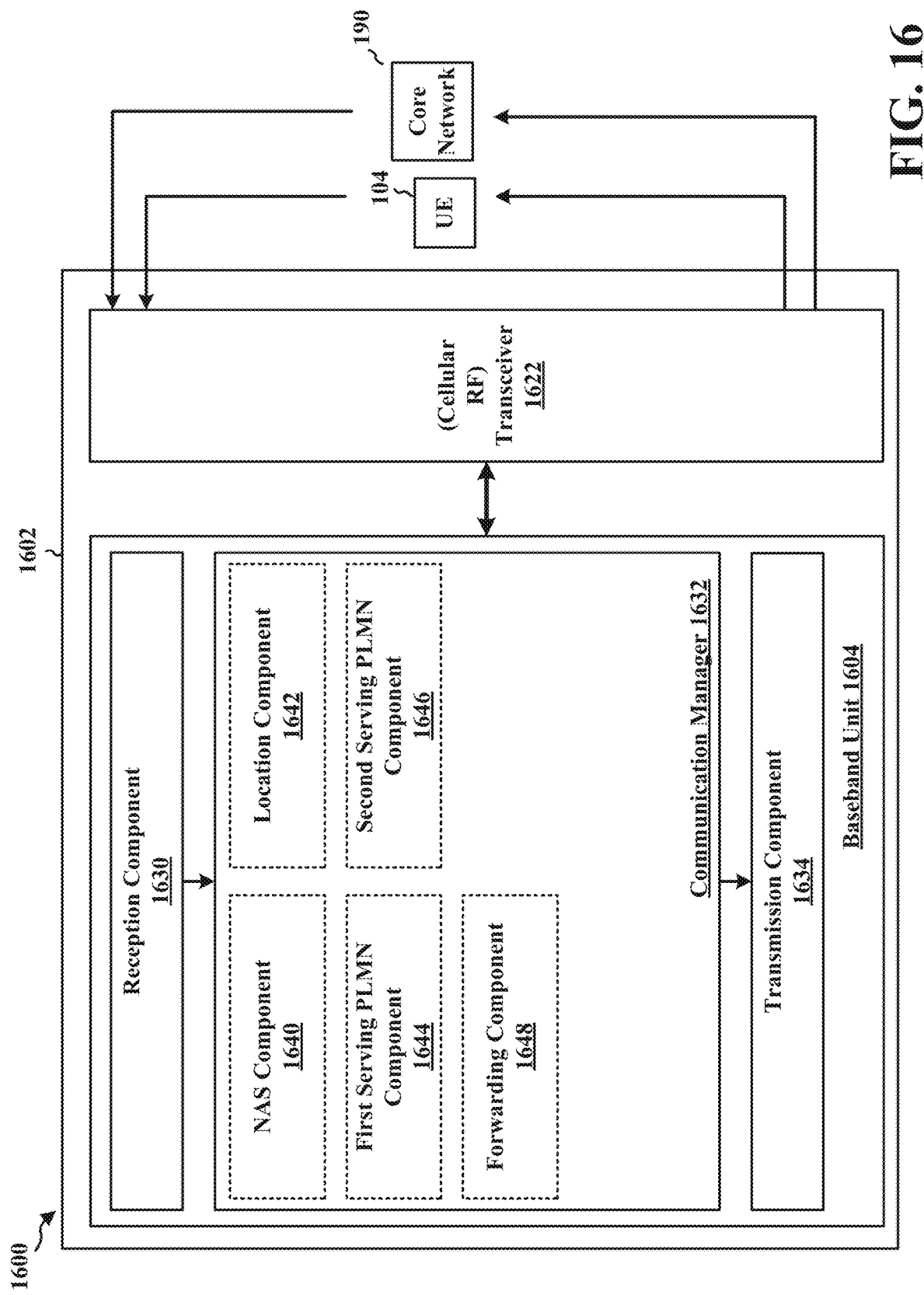
FIG. 16 is a diagram illustrating an example of a hardware implementation for an example apparatus.

FIG. 16 is a diagram 1600 illustrating an example of a hardware implementation for an apparatus 1602. The apparatus 1602 is a base station (e.g., a base station 406, 502, 602 or 607) and includes a baseband unit 1604. The baseband unit 1604 may communicate through a (cellular RF) transceiver 1622 with the UE 104 and the core network 190. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the BS 310 and may include the memory 376 and/or at least one of the TX processor 316, the RX processor 370, and the controller/processor 375.

The communication manager 1632 includes a NAS component 1640 that is configured to receive, from the UE via a communication satellite and a radio cell, a NAS message and an indication of a plurality of preferred PLMNs including a preferred PLMN for each of multiple potential geographic locations of the UE, e.g., as described in connection with 1302 in FIG. 13. The communication manager 1632 further includes a location component 1642 that is configured to attempt to determine a current geographic location of the UE, e.g., as described in connection with 1304 in FIG. 13. The communication manager 1632 further includes a first serving PLMN component 1644 that is configured to determine the serving PLMN as the preferred PLMN indicated by the UE for the current geographic location of the UE when the attempt to determine the current geographic location of the UE is successful, e.g., as described in connection with 1306 in FIG. 13. The communication manager 1632 further includes a second serving PLMN component 1646 that is configured to determine the serving PLMN as one of the plurality of preferred PLMNs indicated by the UE when the attempt to determine the current geographic location of the UE is not successful, e.g., as described in connection with 1308 in FIG. 13. The communication manager 1632 further includes a forwarding component 1648 that is configured to forward the NAS message to the serving PLMN, e.g., as described in connection with 1310 in FIG. 13.

The apparatus may include additional components that perform each of the blocks of the algorithm in the aforementioned flowcharts of FIG. 13. As such, each block in the aforementioned flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1602, and in particular the baseband unit 1604, includes means for receiving, from the UE via a communication satellite and a radio cell, a NAS message and an indication of a plurality of preferred PLMNs including a preferred PLMN for each of multiple potential geographic locations of the UE. The apparatus 1602 may include means for attempting to determine a current geographic location of the UE. The apparatus 1602 may include means for determining the serving PLMN as the preferred PLMN indicated by the UE for the current geographic location of the UE when the attempt to determine the current geographic location of the UE is successful. The apparatus 1602 may include means for determining the serving PLMN as one of the plurality of preferred PLMNs indicated by the UE when the attempt to determine the current geographic location of the UE is not successful. The apparatus 1602 may include means for forward the NAS message to the serving PLMN.

In one configuration, the current geographic location of the UE may include a country or an international area in which the UE is currently located. In one configuration, the apparatus 1602 may include means for transmitting, in system information for the radio cell, a coverage indication indicating multiple geographic areas having coverage by the radio cell. Each of the multiple geographic areas may include a country or an international area. In one configuration, the apparatus 1602 may include means for receiving a NAS response message from the serving PLMN. The apparatus 1602 may include means for forwarding the NAS response message to the UE with an indication of at least one of the serving PLMN or the current geographic location of the UE. In one configuration, the apparatus 1602 may include means for receiving from the serving PLMN an indication that the UE is not located in a geographic location supported by the serving PLMN. The apparatus 1602 may include means for determining a second PLMN from the plurality of preferred PLMNs indicated by the UE. The apparatus 1602 may include means for forwarding the NAS message to the second PLMN. In one configuration, the apparatus 1602 may include means for receiving an indication from the serving PLMN of a second geographic location at which the UE is currently located. The apparatus 1602 may include means for determining the second PLMN as the preferred PLMN indicated by the UE for the second geographic location. In one configuration, the apparatus 1602 may include means for receiving from the serving PLMN an indication indicating that the UE has moved to a second geographic location not supported by the serving PLMN. The apparatus 1602 may include means for determining a second PLMN as the preferred PLMN indicated by the UE for the second geographic location of the UE. The apparatus 1602 may include means for performing a handover of the UE to the second PLMN. In one configuration, the apparatus 1602 may include means for determining that the UE has moved to a second geographic location not supported by the serving PLMN. The apparatus 1602 may include means for determining a second PLMN as the preferred PLMN indicated by the UE for the second geographic location of the UE. The apparatus 1602 may include means for performing a handover of the UE to the second PLMN. In one configuration, the base station may be part of the communication satellite. In one configuration, the base station may be a terrestrial base station. In one configuration, the communication satellite may include a DU and the base station may include a terrestrial CU.

The aforementioned means may be one or more of the aforementioned components of the apparatus 1602 configured to perform the functions recited by the aforementioned means. As described supra, the apparatus 1602 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 17:
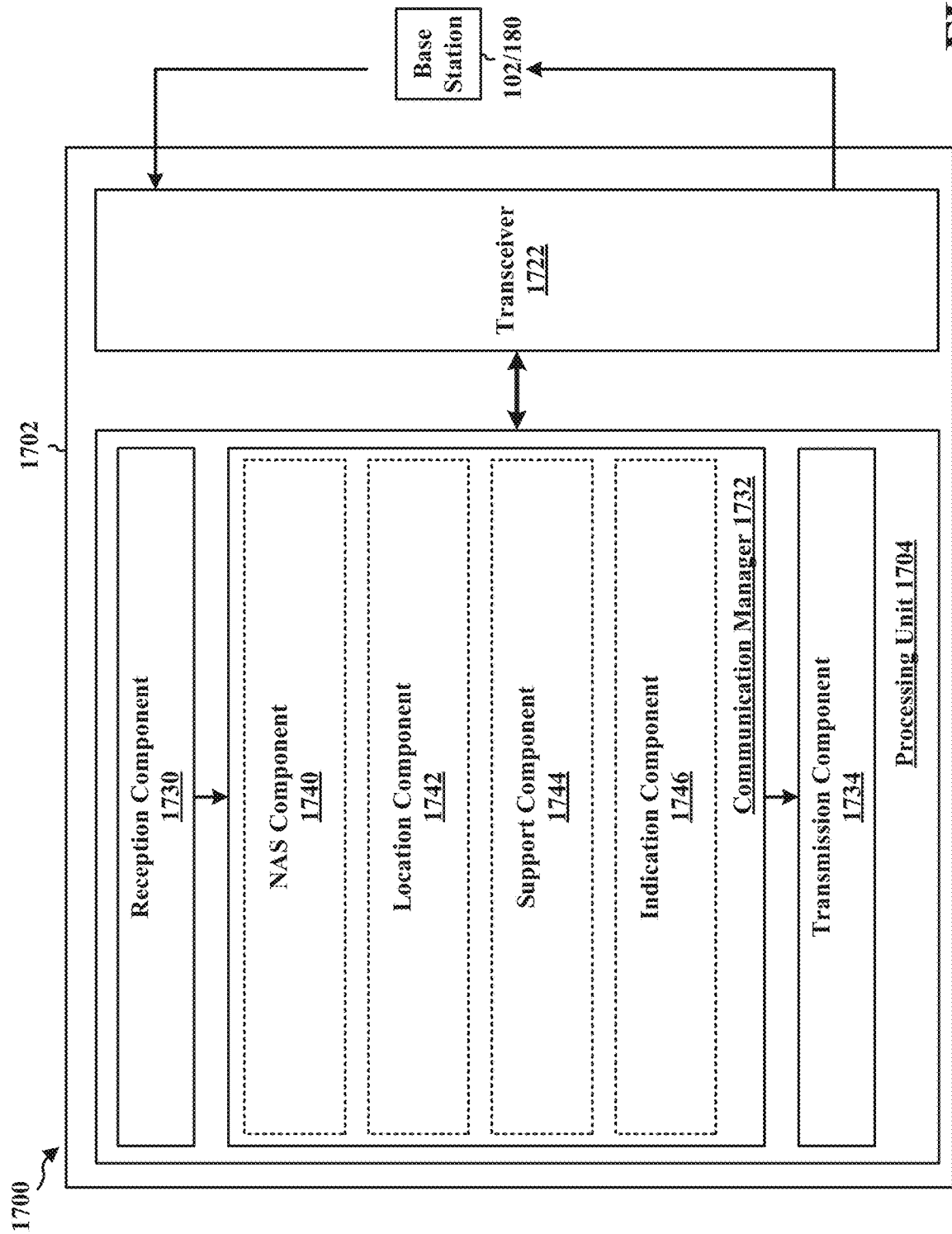
FIG. 17 is a diagram illustrating an example of a hardware implementation for an example apparatus.

FIG. 17 is a diagram 1700 illustrating an example of a hardware implementation for an apparatus 1702. The apparatus 1702 is a network node of a PLMN (in particular, an AMF such as AMF 422 or an AMF 192) and includes a processing unit 1704. The processing unit 1704 may communicate through a transceiver 1722 with the BS 102/180. The baseband unit 1604 may include a computer-readable medium/memory. The processing unit 1704 is responsible for general processing, including the execution of software stored on the computer-readable medium/memory. The software, when executed by the processing unit 1704, causes the processing unit 1704 to perform the various functions described supra. The computer-readable medium/memory may also be used for storing data that is manipulated by the processing unit 1704 when executing software. The processing unit 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the processing unit 1704. The processing unit 1704 may be a component of the AMF 192/193.

The communication manager 1732 includes a NAS component 1740 that is configured to receive, from a base station a NAS message, the NAS message received by the base station from the UE via a communication satellite, e.g., as described in connection with 1402 in FIG. 14. The communication manager 1732 further includes a location component 1742 that is configured to obtain a current geographic location of the UE, e.g., as described in connection with 1404 in FIG. 14. The communication manager 1732 further includes a support component 1744 that is configured to determine that the current geographic location of the UE is not supported by the serving PLMN, e.g., as described in connection with 1406 in FIG. 14. The communication manager 1732 further includes an indication component 1746 that is configured to indicate, to the base station, the current geographic location of the UE, e.g., as described in connection with 1408 in FIG. 14.

The apparatus may include additional components that perform each of the blocks of the algorithm in the aforementioned flowchart of FIG. 14. As such, each block in the aforementioned flowchart of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1702, and in particular the processing unit 1704, includes means for receiving, from a base station a NAS message. The NAS message may have been received by the base station from the UE via a communication satellite. The apparatus 1702 may include means for obtaining a current geographic location of the UE. The apparatus 1702 may include means for determining that the current geographic location of the UE is not supported by the serving PLMN. The apparatus may 1702 may include means for indicating, to the base station, the current geographic location of the UE.

In one configuration, the apparatus 1702 may include means for indicating the current geographic location of the UE in an NGAP Context Release Command message. In one configuration, the base station may determine a second PLMN. The second PLMN may support the current geographic location of the UE. The base station may forward the NAS message to the second PLMN. In one configuration, the apparatus 1702 may include means for obtaining the current geographic location of the UE from a location server. In one configuration, the network node may include an AMF.

The aforementioned means may be one or more of the aforementioned components of the apparatus 1702 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method for supporting satellite wireless access by a UE to a serving PLMN, the method performed by the UE, the method including: accessing a radio cell supported by a communication satellite; selecting a preferred PLMN for each of multiple potential geographic locations of the UE; and transmitting, to a base station via the radio cell and the communication satellite, an indication of the preferred PLMN for each of the multiple potential geographic locations of the UE.

Aspect 2 is the method of aspect 1, where for each of the multiple potential geographic locations of the UE, the indication of the preferred PLMN includes an MNC.

Aspect 3 is the method of aspect 2, where the indication of the preferred PLMN further include an MCC.

Aspect 4 is the method of any of aspects 1 to 3, where each of the multiple potential geographic locations includes a country or an international area.

Aspect 5 is the method of any of aspects 1 to 4, further including: receiving system information via the radio cell indicating available PLMNs, the available PLMNs providing coverage to the multiple potential geographic locations of the UE, the system information including an MCC and an MNC for each of the available PLMNs; and selecting the preferred PLMN for each of the multiple potential geographic locations of the UE from among the available PLMNs.

Aspect 6 is the method of aspect 5, where determining the multiple potential geographic locations of the UE is based on the MCCs of the available PLMNs included in the system information.

Aspect 7 is the method of any of aspects 1 to 4, further including: receiving via the radio cell, in system information, a coverage indication indicating multiple geographic areas having coverage by the radio cell, where each of the multiple geographic areas includes a country or an international area; and determining the multiple potential geographic locations of the UE based on the multiple geographic areas indicated in the coverage indication.

Aspect 8 is the method of any of aspects 1 to 7, where the UE selects the preferred PLMN for each of the multiple potential geographic locations of the UE using priority information included in a USIM of the UE.

Aspect 9 is the method of any of aspects 1 to 8, where the base station determines a current geographic location of the UE, where the base station determines the serving PLMN based on the indication of the preferred PLMN received from the UE for the current geographic location of the UE.

Aspect 10 is the method of any of aspects 1 to 9, where the base station is a terrestrial base station or is part of the communication satellite.

Aspect 11 is the method of any of aspects 1 to 8, where the communication satellite includes a DU and the base station includes a terrestrial CU.

Aspect 12 is a method for supporting satellite wireless access by a UE to a serving PLMN, the method performed by a base station, the method including: receiving, from the UE via a communication satellite and a radio cell, a NAS message and an indication of a plurality of preferred PLMNs including a preferred PLMN for each of multiple potential geographic locations of the UE; attempting to determine a current geographic location of the UE; determining the serving PLMN as the preferred PLMN indicated by the UE for the current geographic location of the UE when the attempt to determine the current geographic location of the UE is successful; determining the serving PLMN as one of the plurality of preferred PLMNs indicated by the UE when the attempt to determine the current geographic location of the UE is not successful; and forwarding the NAS message to the serving PLMN.

Aspect 13 is the method of aspect 12, where the current geographic location of the UE includes a country or an international area in which the UE is currently located.

Aspect 14 is the method of any of aspects 12 and 13, further including: transmitting, in system information for the radio cell, a coverage indication indicating multiple geographic areas having coverage by the radio cell, where each of the multiple geographic areas includes a country or an international area.

Aspect 15 is the method of any of aspects 12 to 14, further including: receiving a NAS response message from the serving PLMN; and forwarding the NAS response message to the UE with an indication of at least one of the serving PLMN or the current geographic location of the UE.

Aspect 16 is the method of any of aspects 12 to 15, further including: receiving from the serving PLMN an indication that the UE is not located in a geographic location supported by the serving PLMN; determining a second PLMN from the plurality of preferred PLMNs indicated by the UE; and forwarding the NAS message to the second PLMN.

Aspect 17 is the method of aspect 16, further including: receiving an indication from the serving PLMN of a second geographic location at which the UE is currently located; and determining the second PLMN as the preferred PLMN indicated by the UE for the second geographic location.

Aspect 18 is the method of any of aspects 12 to 17, further including: receiving from the serving PLMN an indication indicating that the UE has moved to a second geographic location not supported by the serving PLMN; determining a second PLMN as the preferred PLMN indicated by the UE for the second geographic location of the UE; and performing a handover of the UE to the second PLMN.

Aspect 19 is the method of any of aspects 12 to 17, further including: determining that the UE has moved to a second geographic location not supported by the serving PLMN; determining a second PLMN as the preferred PLMN indicated by the UE for the second geographic location of the UE; and performing a handover of the UE to the second PLMN.

Aspect 20 is the method of any of aspects 12 to 19, where the base station is part of the communication satellite.

Aspect 21 is the method of any of aspects 12 to 19, where the base station is a terrestrial base station.

Aspect 22 is the method of any of aspects 12 to 19, where the communication satellite includes a DU and the base station includes a terrestrial CU.

Aspect 23 is a method for supporting satellite wireless access by a UE to a serving PLMN, the method performed by a network node in the serving PLMN, the method including: receiving, from a base station a NAS message, the NAS message received by the base station from the UE via a communication satellite; obtaining a current geographic location of the UE; determining that the current geographic location of the UE is not supported by the serving PLMN; and indicating, to the base station, the current geographic location of the UE.

Aspect 24 is the method of aspect 23, where the network node indicates the current geographic location of the UE in an NGAP Context Release Command message.

Aspect 25 is the method of any of aspects 23 and 24, where the base station determines a second PLMN, the second PLMN supporting the current geographic location of the UE, where the base station forwards the NAS message to the second PLMN.

Aspect 26 is the method of any of aspects 23 to 25, where the network node obtains the current geographic location of the UE from a location server.

Aspect 27 is the method of any of aspects 23 to 26, where the network node includes an AMF.

Aspect 28 is an apparatus for wireless communication including at least one processor coupled to a memory and configured to implement a method as in any of aspects 1 to 27.

Aspect 29 is an apparatus for wireless communication including means for implementing a method as in any of aspects 1 to 27.

Aspect 30 is a computer-readable medium storing computer executable code, where the code when executed by a processor causes the processor to implement a method as in any of aspects 1 to 27.

What is claimed is:

1. A method for supporting satellite wireless access by a user equipment (UE) to a serving public land mobile network (PLMN), the method performed by the UE, the method comprising:
    accessing a radio cell supported by a communication satellite;
    selecting a preferred PLMN for each of multiple potential geographic locations of the UE, one potential geographic location of the multiple potential geographic locations of the UE corresponding to a geographic location of the UE and other potential geographic locations of the multiple potential geographic locations of the UE being different than the geographic location of the UE; and
    transmitting, to a base station via the radio cell and the communication satellite, a message comprising an indication of the preferred PLMN for each of the multiple potential geographic locations of the UE including the other potential geographic locations of the UE different than the geographic location of the UE.

2. The method of claim 1, wherein for each of the multiple potential geographic locations of the UE, the indication of the preferred PLMN comprises a mobile network code (MNC).

3. The method of claim 2, wherein the indication of the preferred PLMN further comprises a mobile country code (MCC).

4. The method of claim 1, wherein each of the multiple potential geographic locations comprises a country or an international area.

5. The method of claim 1, further comprising:
    receiving system information via the radio cell indicating available PLMNs, the available PLMNs providing coverage to the multiple potential geographic locations of the UE, the system information including a mobile country code (MCC) and a mobile network code (MNC) for each of the available PLMNs; and
    selecting the preferred PLMN for each of the multiple potential geographic locations of the UE from among the available PLMNs.

6. The method of claim 5, wherein the multiple potential geographic locations of the UE are based on MCCs of the available PLMNs indicated in the system information.

7. The method of claim 1, further comprising:
    receiving via the radio cell, in system information, a coverage indication indicating multiple geographic areas having coverage by the radio cell, wherein each of the multiple geographic areas comprises a country or an international area,
    wherein the multiple potential geographic locations of the UE are based on the multiple geographic areas indicated in the coverage indication.

8. The method of claim 1, wherein selecting the preferred PLMN includes selecting the preferred PLMN for each of the multiple potential geographic locations of the UE based on priority information located in a universal subscriber identity module (USIM) of the UE.

9. The method of claim 1, further comprising receiving, from the base station, an additional indication of a serving PLMN, wherein the serving PLMN is based on the indication of the preferred PLMN and a current geographic location of the UE.

10. The method of claim 1, wherein the base station is a terrestrial base station or is part of the communication satellite.

11. The method of claim 1, wherein the communication satellite comprises a distributed unit (DU) and the base station comprises a terrestrial central unit (CU).

12. The method of claim 1, wherein transmitting the message comprising the indication of the preferred PLMN for each of the multiple potential geographic locations of the UE includes transmitting the message independent of the geographic location of the UE.

13. The method of claim 1, further comprising:
receiving system information indicating multiple available PLMNs including at least one PLMN associated with a first mobile country code (MCC) and one or more PLMNs associated with a second MCC, wherein transmitting the message comprising the indication of the preferred PLMN for each of the multiple potential geographic locations of the UE includes transmitting a first indication of a first preferred PLMN of the at least one PLMN and a second indication of a second preferred PLMN of the one or more PLMNS.

14. A user equipment (UE), comprising:
a transceiver;
memory comprising instructions; and
at least one processor configured to execute the instructions to cause the UE to:
access a radio cell supported by a communication satellite;
select a preferred public land mobile network (PLMN) for each of multiple potential geographic locations of the UE, one potential geographic location of the multiple potential geographic locations of the UE corresponding to a geographic location of the UE and other potential geographic locations of the multiple potential geographic locations of the UE being different than the geographic location of the UE; and
transmit, via the transceiver to at least one of the radio cell or the communication satellite, a message comprising an indication of the preferred PLMN for each of the multiple potential geographic locations of the UE including the other potential geographic locations of the UE different than the geographic location of the UE.

15. The UE of claim 14, wherein for each of the multiple potential geographic locations of the UE, the indication of the preferred PLMN comprises a mobile network code (MNC).

16. The UE of claim 15, wherein the indication of the preferred PLMN further comprises a mobile country code (MCC).

17. The UE of claim 14, wherein each of the multiple potential geographic locations comprises a country or an international area.

18. The UE of claim 14, the at least one processor being further configured to cause the UE to:
receive, via the transceiver, system information indicating available PLMNs, the available PLMNs providing coverage to the multiple potential geographic locations of the UE, the system information including a mobile country code (MCC) and a mobile network code (MNC) for each of the available PLMNs; and
select the preferred PLMN for each of the multiple potential geographic locations of the UE from among the available PLMNs.

19. The UE of claim 18, wherein the multiple potential geographic locations of the UE are based on MCCs of the available PLMNs indicated in the system information.

20. The UE of claim 14, the at least one processor being further configured to cause the UE to:
receive, via the transceiver, system information that includes a coverage indication indicating multiple geographic areas having coverage by the radio cell, wherein each of the multiple geographic areas comprises a country or an international area, wherein the multiple potential geographic locations of the UE are based on the multiple geographic areas indicated in the coverage indication.

21. The UE of claim 14, wherein the at least one processor is further configured to cause the UE to select the preferred PLMN for each of the multiple potential geographic locations of the UE using priority information comprised in a universal subscriber identity module (USIM) of the UE.

22. An apparatus for wireless communication, comprising:
memory comprising instructions; and
at least one processor configured to execute the instructions to cause the apparatus to:
access a radio cell supported by a communication satellite;
select a preferred public land mobile network (PLMN) for each of multiple potential geographic locations of the apparatus, one potential geographic location of the multiple potential geographic locations of the apparatus corresponding to a geographic location of the apparatus and other potential geographic locations of the multiple potential geographic locations of the apparatus being different than the geographic location of the apparatus; and
provide for transmission to at least one of the radio cell or the communication satellite a message comprising an indication of the preferred PLMN for each of the multiple potential geographic locations of the apparatus including the other potential geographic locations of the UE different than the geographic location of the apparatus.

23. The apparatus of claim 22, wherein for each of the multiple potential geographic locations of the apparatus, the indication of the preferred PLMN comprises a mobile network code (MNC).

24. The apparatus of claim 23, wherein the indication of the preferred PLMN further comprises a mobile country code (MCC).

25. The apparatus of claim 22, wherein each of the multiple potential geographic locations comprises a country or an international area.

26. The apparatus of claim 22, wherein the at least one processor is further configured to cause the apparatus to:
receive system information indicating available PLMNs, the available PLMNs providing coverage to the multiple potential geographic locations of the apparatus, the system information including a mobile country code (MCC) and a mobile network code (MNC) for each of the available PLMNs; and
select the preferred PLMN for each of the multiple potential geographic locations of the apparatus from among the available PLMNs.

27. The apparatus of claim 26, wherein the multiple potential geographic locations of the apparatus are based on MCCs of the available PLMNs indicated in the system information.

28. The apparatus of claim 22, wherein the at least one processor is further configured to cause the apparatus to:
receive system information that includes a coverage indication indicating multiple geographic areas having coverage by the radio cell, wherein each of the multiple geographic areas comprises a country or an international area, wherein the multiple potential geographic locations of the apparatus are based on the multiple geographic areas indicated in the coverage indication.

29. The apparatus of claim 22, wherein the selection of the preferred PLMN for each of the multiple potential geographic locations comprises using priority information comprised in a universal subscriber identity module (USIM).

30. A user equipment (UE), comprising:
- means for accessing a radio cell supported by a communication satellite;
- means for selecting a preferred public land mobile network (PLMN) for each of multiple potential geographic locations of the UE, one potential geographic location of the multiple potential geographic locations of the UE corresponding to a geographic location of the UE and other potential geographic locations of the multiple potential geographic locations of the UE being different than the geographic location of the UE; and
- means for transmitting, to a base station via the radio cell and the communication satellite, a message comprising an indication of the preferred PLMN for each of the multiple potential geographic locations of the UE the other potential geographic locations of the UE different than the geographic location of the UE in a single message.

* * * * *